(12) United States Patent
Bavor, Jr. et al.

(10) Patent No.: US 11,100,714 B2
(45) Date of Patent: Aug. 24, 2021

(54) ADJUSTING VIDEO RENDERING RATE OF VIRTUAL REALITY CONTENT AND PROCESSING OF A STEREOSCOPIC IMAGE

(71) Applicant: GOOGLE LLC, Mountain View, CA (US)

(72) Inventors: Clayton Woodward Bavor, Jr., Atherton, CA (US); Joshua Weaver, Mountain View, CA (US); Alexander James Faaborg, Mountain View, CA (US); Eliezer Peli, Needham, MA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 16/298,441

(22) Filed: Mar. 11, 2019

(65) Prior Publication Data

US 2019/0206139 A1 Jul. 4, 2019

Related U.S. Application Data

(63) Continuation of application No. 14/978,320, filed on Dec. 22, 2015, now Pat. No. 10,229,540.

(51) Int. Cl.
*G06T 19/00* (2011.01)
*G02B 27/01* (2006.01)
(Continued)

(52) U.S. Cl.
CPC .......... *G06T 19/006* (2013.01); *G02B 27/017* (2013.01); *G06F 1/163* (2013.01);
(Continued)

(58) Field of Classification Search
None
See application file for complete search history.

(56) References Cited

U.S. PATENT DOCUMENTS 6,717,578 B1 4/2004 Deering
8,291,460 B1 10/2012 Peacock et al.
(Continued)

FOREIGN PATENT DOCUMENTS

CN 101536077 A 9/2009
JP 2000193910 A 7/2000
(Continued)

OTHER PUBLICATIONS

PCT/US2016/067824, "International Search Report and Written Opinion received", dated Jun. 22, 2017, 24 Pages.
(Continued)

*Primary Examiner* — Jeffrey J Chow
(74) *Attorney, Agent, or Firm* — Brake Hughes Bellermann LLP

(57) ABSTRACT

An example technique may include performing, by a virtual reality application provided on a computing device, video rendering at a first video rendering rate based on updating an entire image on a screen of the computing device at a first update rate, determining that a performance of the video rendering is less than a threshold, performing, based on the determining, video rendering at a second video rendering rate by updating a first portion of the image at the first update rate, and by updating a second portion of the image at a second update rate that is less than the first update rate. Another example technique may include shifting, during an eye blinking period, one or both of a left eye image and a right eye image to reduce a disparity between a left viewed object and a right viewed object.

20 Claims, 16 Drawing Sheets

(51) Int. Cl.
*G06F 1/16* (2006.01)
*G06F 3/01* (2006.01)
*G06T 3/40* (2006.01)

(52) U.S. Cl.
CPC .............. *G06F 3/011* (2013.01); *G06F 3/012* (2013.01); *G06F 3/013* (2013.01); *G06F 3/017* (2013.01); *G06T 3/40* (2013.01); *G02B 2027/0134* (2013.01)

(56) References Cited

U.S. PATENT DOCUMENTS

| | | | |
|---|---|---|---|
| 8,677,387 | B2 | 3/2014 | Carvajal et al. |
| 8,810,511 | B2 | 8/2014 | Huntzicker et al. |
| 8,836,641 | B1 | 9/2014 | Kim et al. |
| 8,910,228 | B2 | 12/2014 | Kurkure et al. |
| 9,123,142 | B2 | 9/2015 | Sullivan et al. |
| 2007/0146294 | A1 | 6/2007 | Nurmi et al. |
| 2008/0111833 | A1 | 5/2008 | Thorn et al. |
| 2009/0113338 | A1* | 4/2009 | Hamilton, II ...... G06K 9/00671 715/781 |
| 2012/0242570 | A1 | 9/2012 | Kobayashi |
| 2013/0241955 | A1* | 9/2013 | Tamaru ................ H04N 13/156 345/633 |
| 2013/0259400 | A1 | 10/2013 | Takagi et al. |
| 2013/0265227 | A1 | 10/2013 | Julian |
| 2014/0225918 | A1 | 8/2014 | Mittal et al. |
| 2014/0268356 | A1* | 9/2014 | Bolas .................. G02B 27/017 359/630 |
| 2014/0292637 | A1 | 10/2014 | Peng et al. |
| 2014/0361977 | A1 | 12/2014 | Stafford et al. |
| 2014/0364197 | A1* | 12/2014 | Osman ................. H04M 19/04 463/24 |
| 2015/0029096 | A1 | 1/2015 | Ishihara |
| 2015/0205132 | A1* | 7/2015 | Osterhout .......... G02B 27/0093 345/633 |
| 2015/0268720 | A1 | 9/2015 | Kobayashi |
| 2015/0310665 | A1* | 10/2015 | Michail .............. G02B 27/0179 345/419 |
| 2016/0124499 | A1* | 5/2016 | Shiu ........................ G06F 3/011 715/778 |
| 2016/0189429 | A1* | 6/2016 | Mallinson ............ H04N 13/398 345/633 |
| 2016/0224176 | A1* | 8/2016 | Kim ...................... H04N 13/344 |
| 2016/0335801 | A1* | 11/2016 | Yoon ................... G06F 3/04842 |
| 2017/0084083 | A1 | 3/2017 | Kojima et al. |
| 2017/0091549 | A1 | 3/2017 | Biedert et al. |
| 2017/0109935 | A1* | 4/2017 | Loffler .................. G06T 19/006 |
| 2018/0004288 | A1* | 1/2018 | Noda .................... G06F 3/0482 |
| 2018/0025478 | A1* | 1/2018 | Lee .................... H04N 5/23238 382/284 |
| 2018/0095531 | A1* | 4/2018 | Brown ................. H04N 7/0117 |
| 2018/0096461 | A1* | 4/2018 | Okayama ................ G06T 5/001 |
| 2018/0255243 | A1* | 9/2018 | Nakamura ............ G06F 3/011 |
| 2020/0175769 | A1* | 6/2020 | Mandala ............... G06T 19/006 |

FOREIGN PATENT DOCUMENTS

| | | |
|---|---|---|
| JP | 2006215540 A | 8/2006 |
| JP | 2013110662 A | 6/2013 |
| JP | 2013162407 A | 8/2013 |
| JP | 2015095045 A | 5/2015 |
| KR | 20040005290 A | 1/2004 |
| WO | 2010062481 A1 | 6/2010 |
| WO | 2013118379 A1 | 8/2013 |
| WO | 2014197226 A1 | 12/2014 |
| WO | 2015030306 A1 | 3/2015 |
| WO | 2015167905 A2 | 11/2015 |

OTHER PUBLICATIONS

Peli, Eli, et al., "A Binocular Stereoscopic Display System with Coupled Convergence and Accommodation Demands", Peli, et al., "A Binocular Stereoscopic Display System with Coupled Convergence and Accommodation Demands", SID 01 Digest, 53.2, 2001, pp. 1296-1299, 1296-1299.

* cited by examiner

ADJUSTING VIDEO RENDERING RATE OF VIRTUAL REALITY CONTENT AND PROCESSING OF A STEREOSCOPIC IMAGE

CROSS REFERENCE TO RELATED APPLICATION

This application is a continuation of U.S. application Ser. No. 14/978,320, filed Dec. 22, 2015, the disclosure of which is incorporated herein by reference in its entirety.

TECHNICAL FIELD

This description relates to image processing and rendering of virtual reality content, and in particular, to techniques related to adjusting a video rendering rate of virtual-reality content based on a rendering performance and processing of a stereoscopic image.

BACKGROUND

Performing video rendering can consume a significant amount of computing resources. In some cases, multiple applications running on a computing device may share computing resources, which may decrease performance of one or more applications.

In addition, in the real world, there is rarely a conflict between accommodation demand and convergence demand. However, for a VR (virtual reality) image or a stereoscopic image displayed on a screen, there can sometimes be a difference or conflict between accommodation demand and convergence demand. For a display screen, accommodation demand is typically fixed, since a user's eyes are focused on the display screen (e.g., distance from eyes to the screen is fixed). However, in some cases, a disparity (or distance or separation) between a left viewed image and a right viewed image of a stereoscopic image may create a variable convergence demand, and in some cases, this convergence demand may be different than the accommodation demand. This conflict between accommodation demand and convergence demand can create eye strain for the user.

SUMMARY

According to an example implementation, a computer-implemented method is provided for executing instructions stored on a non-transitory computer-readable storage medium, the method including: performing, by a virtual reality application provided on a computing device, video rendering at a first video rendering rate based on updating an entire image on a screen of the computing device at an update rate; determining that a performance of the video rendering is less than a threshold; and performing, based on the determining, video rendering at a second video rendering rate by updating only a portion of the image at the update rate.

According to an example implementation, a computer-implemented method is provided for executing instructions stored on a non-transitory computer-readable storage medium, the method including: performing, by a virtual reality application provided on a computing device, video rendering at a first video rendering rate based on updating an entire image on a screen of the computing device at a first update rate; determining that a performance of the video rendering is less than a threshold; and, performing, based on the determining, video rendering at a second video rendering rate by updating a first portion of the image at the first update rate, and by updating a second portion of the image at a second update rate that is less than the first update rate.

According to an example implementation, a computer-implemented method is provided for executing instructions stored on a non-transitory computer-readable storage medium, the method including: performing, by a virtual reality application provided on a computing device, video rendering at a first video rendering rate; determining that a performance of the video rendering is less than a threshold; and, performing, based on the determining, video rendering at a second video rendering rate by updating a first portion of the image at a first resolution, and by updating a second portion of the image at a second resolution that is different than the first resolution.

According to an example implementation, a computer-implemented method is provided for executing instructions stored on a non-transitory computer-readable storage medium, the method including: receiving an encoded video signal; performing, by a virtual reality application provided on a computing device, video rendering at a first video rendering rate based on the encoded video signal to display a first set of display frames on a screen of the computing device; measuring performance of the video rendering to display the first set of display frames; determining, based on the measured performance of the video rendering, a second video rendering rate based on at least adjusting a portion of the screen that will be used to display a second set of display frames; and performing video rendering at the second video rendering rate based on the encoded video signal to display the second set of display frames on the adjusted portion of the screen.

According to an example implementation, an apparatus may include at least one processor and at least one memory including computer instructions, when executed by the at least one processor, cause the apparatus to: receive an encoded video signal; perform, by a virtual reality application provided on a computing device, video rendering at a first video rendering rate based on the encoded video signal to display a first set of display frames on a screen of the computing device; measure performance of the video rendering to display the first set of display frames; determine, based on the measured performance of the video rendering, a second video rendering rate based on at least adjusting a portion of the screen that will be used to display a second set of display frames; and perform video rendering at the second video rendering rate based on the encoded video signal to display the second set of display frames on the adjusted portion of the screen.

According to an example implementation, a method may include receiving an encoded video signal; performing, by a virtual reality application provided on a computing device, video rendering based on the encoded video signal to display a first set of display frames on a screen of the computing device; detecting a start of an eye blinking period of a user of the computing device; and, allocating computing resources from the virtual reality application to one or more non-virtual reality applications running on the computing device for at least a portion of the eye blinking period.

According to an example implementation, an apparatus may include at least one processor and at least one memory including computer instructions, when executed by the at least one processor, cause the apparatus to: receive an encoded video signal; perform, by a virtual reality application provided on a computing device, video rendering based on the encoded video signal to display a first set of display frames on a screen of the computing device; detect a start of an eye blinking period of a user of the computing device;

and allocate computing resources from the virtual reality application to one or more non-virtual reality applications running on the computing device for at least a portion of the eye blinking period.

According to an example implementation, a computer-implemented method is provided for executing instructions stored on a non-transitory computer-readable storage medium, the method including: performing, by a virtual reality application provided on a computing device, video rendering at a first video rendering rate based on updating an entire image on a screen of the computing device at an update rate; detecting motion or movement of a screen; and performing, based on the detecting, video rendering at a second video rendering rate by updating only a portion of the image at the update rate.

According to an example implementation, a computer-implemented method is provided for executing instructions stored on a non-transitory computer-readable storage medium, the method including: performing, by a virtual reality application provided on a computing device, video rendering at a first video rendering rate based on updating an entire image on a screen of the computing device at a first update rate; detecting motion or movement of the screen; and, performing, based on the detecting, video rendering at a second video rendering rate by updating a first portion of the image at the first update rate, and by updating a second portion of the image at a second update rate that is different than the first update rate.

According to an example implementation, a computer-implemented method is provided for executing instructions stored on a non-transitory computer-readable storage medium, the method including: performing, by a virtual reality application provided on a computing device, video rendering at a first video rendering rate; detecting motion or movement of the screen; and, performing, based on the detecting, video rendering at a second video rendering rate by updating a first portion of the image at a first resolution, and by updating a second portion of the image at a second resolution that is different than the first resolution.

According to another example implementation, a method may include: receiving an encoded video signal; performing, by a virtual reality application provided on a computing device, video rendering based on the encoded video signal to display a first set of display frames of virtual reality content on a screen of the computing device; detecting motion or movement of the computing device; and adjusting, for at least a period of time in response to the detecting the motion or movement, a frame rate for displaying one or more display frames of the virtual reality content on the screen.

According to another example implementation, an apparatus may include at least one processor and at least one memory including computer instructions, when executed by the at least one processor, cause the apparatus to: receive an encoded video signal; perform, by a virtual reality application provided on a computing device, video rendering based on the encoded video signal to display a first set of display frames of virtual reality content on a screen of the computing device; detect motion or movement of the computing device; and adjust, for at least a period of time in response to the detecting the motion or movement, a frame rate for displaying one or more display frames of the virtual reality content on the screen.

According to another example implementation, a method includes displaying, on a screen of a computing device, a stereoscopic image that includes a right eye image and a left eye image, the left eye image and the right eye image each depicting one or more objects; determining a viewed object that is viewed by a user of the computing device, the viewed object including a left viewed object that is part of the left eye image and a right viewed object that is part of the right eye image; measuring a disparity between the left viewed object and the right viewed object; detecting a start of an eye blinking period of a user of the computing device; and shifting, during the eye blinking period, one or both of the left eye image and the right eye image to reduce the disparity between the left viewed object and the right viewed object.

According to another example implementation, an apparatus may include at least one processor and at least one memory including computer instructions, when executed by the at least one processor, cause the apparatus to: display, on a screen of a computing device, a stereoscopic image that includes a right eye image and a left eye image, the left eye image and the right eye image each depicting one or more objects; determine a viewed object that is viewed by a user of the computing device, the viewed object including a left viewed object that is part of the left eye image and a right viewed object that is part of the right eye image; measuring a disparity between the left viewed object and the right viewed object; detecting a start of an eye blinking period of a user of the computing device; and shift, during the eye blinking period, one or both of the left eye image and the right eye image to reduce the disparity between the left viewed object and the right viewed object.

The details of one or more implementations are set forth in the accompanying drawings and the description below. Other features will be apparent from the description and drawings, and from the claims.

DETAILED DESCRIPTION

Figure 1:
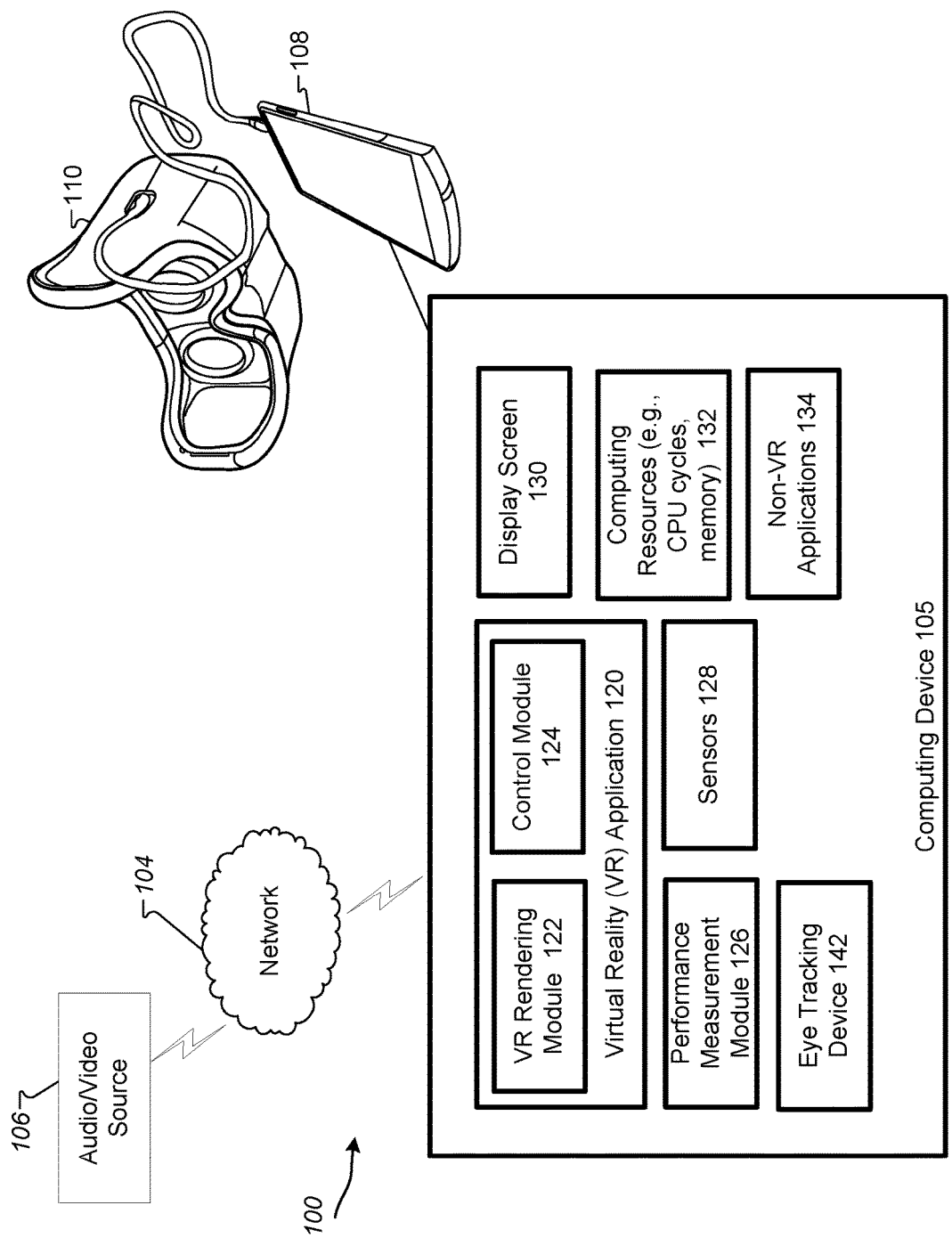
FIG. 1 is a block diagram illustrating a system according to an example implementation.

FIG. 1 is a block diagram illustrating a system 100 according to an example implementation. Referring to FIG. 1, an audio/video source 106 may generate and output audio signals and video signals, which may be distributed or sent to one or more computing devices via a network 104. In an example implementation, the audio/video signals output by audio/video source 106 may be provided as part of virtual reality (VR) content streamed or distributed to one or more computing devices. According to an illustrative example implementation, virtual reality (VR), which may also be referred to as immersive multimedia or computer-simulated life, may, at least in some cases, replicate or simulate, to varying degrees, an environment or physical presence in places in the real world or imagined worlds or environments. Network 104 may be the Internet, a local area network (LAN), a wireless local area network (WLAN), and/or any other network. A computing device 105, for example, may receive the audio/video signals, which may be provided as part of VR content in an illustrative example implementation.

In various example implementations, computing device 105 may include, for example, VR glasses or VR goggles 110, which may provide a virtual reality (VR) experience to a user, e.g., by allowing a user to view virtual reality content (e.g., display images rendered from the VR content) on a display screen and hear audio from the virtual reality content on a speaker, for example. In an illustrative example implementation, VR goggles 110 may display a stereoscopic image, including a left eye image that may typically be viewed by a user's left eye; and a right eye image that may typically be viewed by the users' right eye. Computing device 105 may also include, for example, a mobile device 108, a laptop, a netbook, a PC, a computer, a portable or handheld computer or computing device, or any other computing device. Mobile device 108 may include, for example, a cell phone, a smart phone, a PDA (personal digital assistant), or other mobile computing device. In an example implementation, computing device 105 may be a mobile device (e.g., smart phone) which may be configured to provide or output VR content to a user, while in parallel, running one or more non-VR applications.

Computing device 105 may include a processor for executing or running instructions or software, memory for storing instructions and data, a display screen 130 (e.g., which may be a touch sensitive screen or touch screen) for displaying or outputting display frames or images or other information, a speaker and a microphone and or other input/output devices for example. The processor/CPU and memory of computing device 105 may be shown in FIG. 1 as computing resources 132. Computing resources 132 may include CPU or processor resources such as CPU cycles to execute instructions or process data, and/or computer memory to store instructions or data, and additional computing resources.

Referring to FIG. 1, computing device 105 may include a VR application 120 that may receive a signal(s) from audio/video source 106 and may present or provide VR content to a user via one or more output devices of the computing device 105 such as a display screen 130, a speaker(s) (not shown), or other output device. Display screen 130 may, for example, include an LCD (liquid crystal display) screen, a touchscreen or any other screen or display for displaying images or information to a user, for example. Computing device 105 may also include one or more sensors 128 to detect motion or movement of the computing device 105, such as, for example, an accelerometer or any other sensor that may detect motion or movement or acceleration of the computing device 105 and/or the display screen 130.

VR application 124 may include a VR rendering module 122, e.g., for rendering audio/video content onto computing device 105, and a control module 124 for controlling the operation of VR rendering module 122 and/or VR application 120. VR rendering module 122 may receive audio/video signals from audio/video source 106, and may perform audio rendering and/or video rendering of the virtual reality content. For example, VR rendering module 122 may receive audio signals of the VR content and may output an audio signal to a speaker (not shown) provided as part of computing device 105.

VR rendering module 122 may also receive an encoded video signal from audio/video source 106, and may perform video rendering based on the encoded video signal to display a set of (or plurality of) display frames on a display screen 130 of the computing device 105. In an illustrative example implementation, video rendering may include the process by which a computer or computing device processes information from a coded data source and uses that information to produce and display an image(s) for display on a screen. For example, video rendering may include decoding of a received encoded video signal, generating one or more display frames, and outputting each display frame to a frame buffer for output or display on display screen 130. Video rendering may include additional functions or tasks, e.g., depending on the type of encoded signal that is received. In some cases, video rendering may be computationally or resource intensive and may require a significant amount of the computing resources 132 within computing device 105.

According to an example implementation, video rendering may be performed, for example, by a processor or CPU executing instructions or software to perform the various tasks or functions associated with video rendering such as video decoding, and/or by dedicated hardware such as a graphics processor unit (GPU). For example, if a GPU is present, some video rendering tasks may be offloaded from a main processor/CPU to a GPU. Computing resources 132 may include CPU resources such as CPU execution time/cycles, memory, or any other resource within computing device 105 that may be used to process data. Computing device 105 may include a GPU in an example implementation.

Computing device 105 may also include a performance measurement module 126 for measuring a performance of VR application 120, such as measuring a rendering performance or determining a video rendering rate, or other performance measurement of VR rendering module 122 and/or VR application 120. For example, rendering performance may be measured as an amount of data rendered per amount of time, e.g., a rendering rate may be measured as pixels rendered per second (e.g., pixel rendering rate), bits rendered per second (e.g., bit rendering rate), a frame rate or frame rendering rate (e.g., frames per second), or other rendering performance measurement.

In an example implementation, control module 124 may compare the video rendering performance of VR application 120 to a threshold, and may then adjust (e.g., increase or decrease) the video rendering rate of the VR application 120 or VR rendering module 122 based on the comparison. For example, if the video rendering rate of the VR application 120 is less than the threshold, then the control module 124 may determine an updated video rendering rate that may be less then the previous video rendering rate, e.g., because the VR application 120 was unable to meet or satisfy the threshold video rendering rate performance. In an example implementation, control module 124 may determine an updated or adjusted video rendering rate that may be greater than a previous video rendering rate if the measured video rendering rate is greater than a threshold rendering rate, for example. In other words, the video rendering rate of the VR application 120 may be increased if the measured video rendering rate performance exceeded the threshold video rendering rate, according to an example implementation. As described in greater detail below, VR application 120 may adjust or update a video rendering rate using a number of different techniques, such as, for example: adjusting a portion of display screen 130 that may be used to display one or more images of the VR content, and/or adjusting an update rate (on all or a portion of a display screen), and/or adjusting a resolution for (for all or a portion of) the display of one or more images or display frames. For example, different portions of an image (e.g., central portion vs. peripheral portion) may be updated at different update rates, e.g., to allow a first portion of an image (e.g., central portion) to be updated at a greater rate than a second (e.g., peripheral) portion of an image. Likewise, a first (e.g., central) portion of an image may be updated at a first resolution (e.g., high resolution), while a second (e.g., peripheral) portion of an image may be updated at a second resolution that is lower than the first resolution. Other techniques may also be used. In this manner, the video rendering rate may be adjusted using one or more example techniques. According to an example implementation, a refresh rate may be the rate at which a display screen is refreshed, and this refresh rate may be fixed (at least in some cases) based on the screen. An update rate may be a rate at which new image data is written to the display screen. A frame rate may be a rate at which a frame is updated, which may often be the same as the refresh rate. Also, in one example implementation, the update rate and the frame rate may be the same rate.

As noted, computing device 105 may include one or more computing resources 132, e.g., which may include CPU or processor resources such as CPU cycles to execute or instructions or process data, and/or computer memory to store instructions or data. Allocating more of the available computing resources 132 to VR application 120 may allow VR application 120 to perform video rendering at a higher video rendering rate, according to an example implementation. On the other hand, if sufficient computing resources 132 are not allocated to VR application 120, it is possible that the performance of VR application 120 (e.g., including the video rendering rate achieved by the VR application 120) will be inhibited or limited based on such limited computing resources 132. As a result, in the case of an insufficient allocation of computing resources 132 to the VR application 120, the video rendering performance of the VR application 120 may, at least in some cases, be unable to achieve a target or threshold video rendering rate, for example.

In addition to VR application 120, computing device 105 may also include a variety of non-VR applications 134. In an illustrative example implementation, non-VR applications 134 may include any application that is not involved with the rendering or other processing of signals to present the VR content to the user of computing device 105. For example, non-VR applications 134 may include, e.g., an email program to send and receive email, a social media application, a weather application to receive weather information, a texting or messaging application to send or receive messages from other users, a music player or music application to play songs or music, a web browser to download webpages, or other applications that may be running or provided on computing device 105. In some cases, computing resources 132 may be allocated or shared among multiple applications that may be running in parallel on computing device 105, e.g., computing resources may be shared by VR application 120 and one or more non-VR applications 134, for example.

Figure 2:
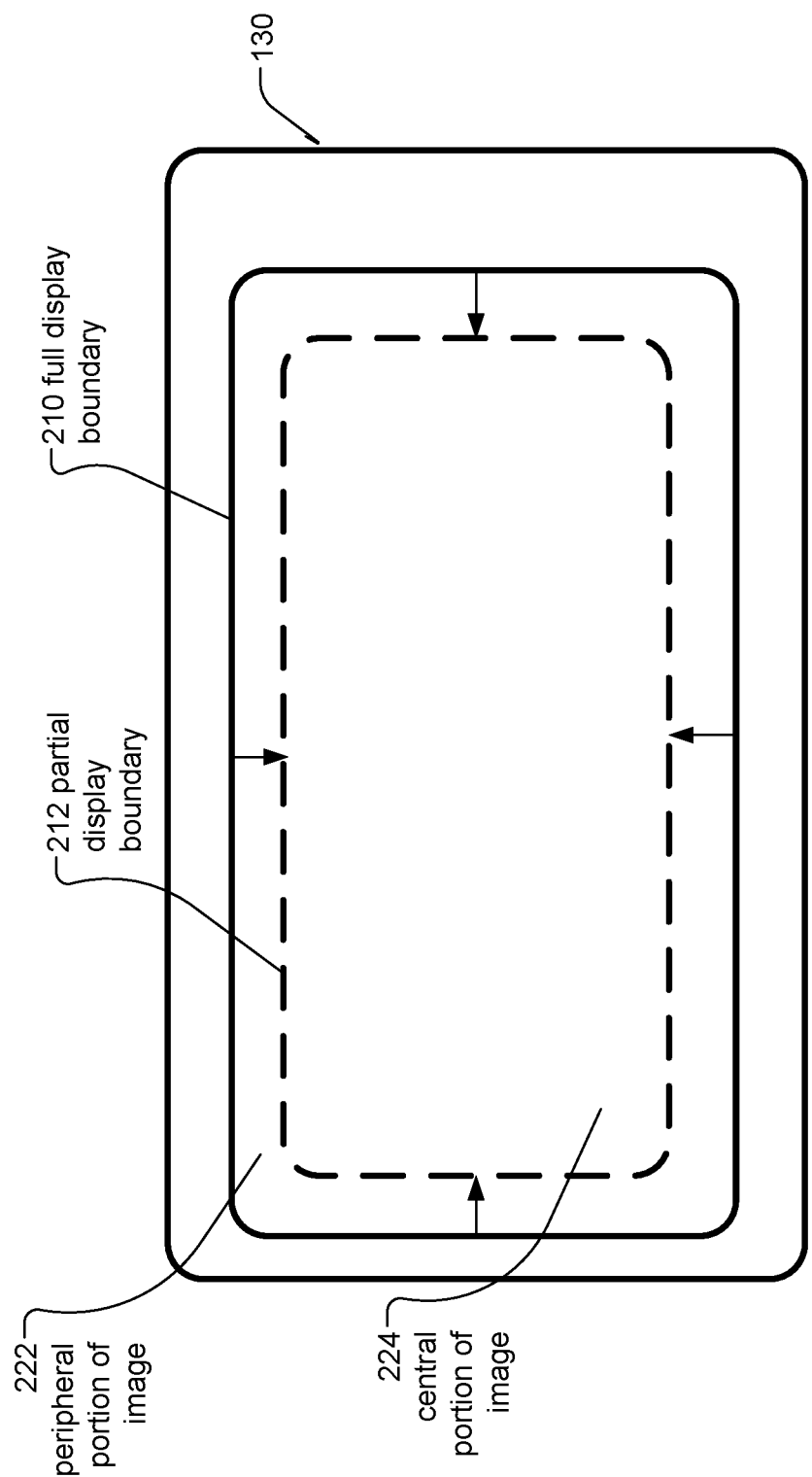
FIG. 2 is a diagram of display screen 130 where a portion of the display screen used to display frames may be adjusted according to an example implementation.

FIG. 2 is a diagram of display screen 130 where a portion of the display screen used to display frames or images may be adjusted according to an example implementation. Referring to FIG. 2, a full display boundary 210 of screen 130 may define an outer boundary of the full area/portion of screen 130 for displaying images. A partial display boundary 212 of screen 130 identifies a boundary of the display area of screen 130 that is less than the full display boundary 210. Therefore, full display boundary 210 may provide an outer boundary that includes all the pixels (picture elements) of this display screen 130, whereas, partial display boundary 212 may define an outer boundary for a portion of the screen that include a subset (or less than all) of the pixels of the display screen 130. For example, a central portion 224 of an image may be provided within the partial display boundary 212, while a peripheral portion 222 of an image may be provided between the full display boundary 210 and the partial display boundary 212. Thus, for example, a full area/portion (within full display boundary 210) of screen 130 may include central portion 224 (within partial display boundary 212) plus the peripheral portion 222 that is located between boundaries 210 and 212.

According to an example implementation, control module 124 of VR application 120 may measure a performance of the video rendering performed by VR rendering module 122. For example, control module 124 may measure a video rendering performance, e.g., by measuring a video rendering rate achieved by VR rendering module 122 to display a set of frames. Control module 124 may also, for example, compare the performance of the video rendering (e.g., the measured first video rendering rate) to a threshold. For example, control module 124 may determine a second or adjusted video rendering rate that will be used to display a set of display frames as part of the VR content, based on the comparison of the measured first video rendering rate to the threshold. For example, the second or adjusted video rendering rate may be determined based upon, e.g., adjusting or varying a portion (or selecting an adjusted portion) of the display screen 130 to display frames. While only one threshold is described in this illustrative example, multiple thresholds may be used for comparing a video rendering rate and then determining a selected or adjusted portion of a display screen to be used to display one or more display frames, e.g. to adjust the video rendering rate or to select an updated or second video rendering rate based on the comparison.

For example, control module 124 may determine an adjusted or second video rendering rate that is less than the initial or first rendering rate if the performance of the video rendering (or the measured video rendering rate) is less than the threshold, according to an example implementation. For example, a lower (or decreased) video rendering rate may be achieved by adjusting a portion or selecting an adjusted portion of the display screen 130 used to display one or more display frames. Referring to FIG. 2, according to an example implementation, the display screen 130 within the full display boundary 210 (FIG. 2) may initially be used to display images of the VR content at a first video rendering rate. In this illustrative example, in response to determining that the measured first video rendering rate is less than the threshold, control module 124 may select an adjusted portion (or adjust the portion) of the screen 130 that includes less than the full portion of display screen 130, such as central portion 224 of within the partial display boundary 212 (for example), to display one or more display frames in accordance with a second video rendering rate that is less than the first video rendering rate. In this manner, for example, the video rendering rate of the VR application 120 may be decreased by at least decreasing a portion of the screen 130 (e.g., decreased from a portion of the screen 130 within full display boundary 210 to a smaller portion of the screen 130 within partial display boundary 212) used to display frames, which may result in decreasing the amount of data per frame (or pixels per frame) to be rendered, e.g., which may allow a target frame rate to be achieved by the video rendering module 122. In some example implementations, other steps may also be taken to reduce the video rendering rate (e.g., by reducing the frame rate and/or reducing the image or display frame resolution). This may, for example, result in a decreased video rendering rate, e.g., which may be useful or advantageous in the event that the VR application 120 or VR rendering module 122 is unable to achieve a threshold video rendering rate. As noted above, if one or more non-VR applications 134 are occupying or using significant computing resources 132, this may result in an underperformance of the VR application 120 or VR rendering module 122. In such a case, for example, one solution may be to decrease the video rendering rate via reducing the amount of rendered data per display frame, e.g., by reducing the amount of pixels rendered per display frame, e.g., which may allow a target frame rate to be achieved. This may be accomplished, for example, by selecting an adjusted portion of screen 132 (which may correspond to the central portion 224 within partial display boundary 212, as an example) used to display one or more display frames.

For example, if a target or threshold frame rate (frame rendering rate, in frames per second) cannot be achieved by video rendering module 122, e.g., based on inadequate resources, then the video rendering load (pixels per frame) of each (or one or more) display frame may be reduced by adjusting or selecting an adjusted portion of the display screen 130 (e.g., selecting a smaller portion of the display screen, and thereby reducing an amount of pixels per display frame for display), which may reduce the overall video rendering rate.

According to another example implementation, control module 124 may determine an adjusted or second video rendering rate that is greater than the initial or first rendering rate if the performance of the video rendering (or the measured video rendering rate) is greater than the threshold, for example. In an example implementation, a greater (or increased) video rendering rate may be achieved by adjusting a portion or selecting an adjusted portion of the display screen 130 used to display one or more display frames, e.g., while maintaining the same or similar frame rate. Referring to FIG. 2, according to an example implementation, a full portion of the display screen 130 within the partial display boundary 212 (FIG. 2) may be initially used to display images of the VR content at a first video rendering rate. In this illustrative example, in response to determining that the measured first video rendering rate is greater than the threshold, control module 124 may select an adjusted portion (or adjust, e.g., increase, the portion) of the screen 130, which may include a larger area or portion or more pixels than a portion within partial display boundary 212, e.g., which may correspond to a full portion of the screen within full display boundary 210 (for example), to display one or more display frames in accordance with a second video rendering rate that is greater than the first video rendering rate. Thus, for example, a portion of the screen 130 used to display images may be increased by adding a peripheral portion 222 (which is provided between boundaries 212 and 210) to the central portion 224, such that the full or entire portion of the screen within full display boundary 210 may now be used to display image(s). Therefore, in this example, a higher or increased rendering rate may be achieved or accomplished by increasing the amount or number of pixels rendered per display frame, e.g., by increasing the portion of screen 130 used to display frames, such as by increasing a selected portion of screen 130 from a central portion 224 of the screen 130 within partial display boundary 212 to the full portion of the screen within the full display boundary 210, according to an example implementation (e.g., with the increase in the portion of the screen or number of pixels due to adding the peripheral portion 222 between the partial display boundary 212 and the full display boundary 210). Other steps may also be taken to increase a video rendering rate, e.g., such as by increasing a frame rate for the display of one or more display frames, and/or increasing a resolution of images or display frames displayed on the screen 130.

Also, increasing a video rendering rate may typically be performed when there are sufficient resources (e.g., computational resources, memory resources, etc.) available to handle such an increase in video rendering rate. According to another example implementation, in response to determining that the first video rendering rate is less than a threshold, computing resources 132 may be allocated from one or more non-VR applications 134 to VR application 120 e.g., which may allow the performance or video rendering rate achieved by VR application 120 or VR rendering module 122 to increase or improve. Similarly, if a video rendering rate or video rendering performance of the VR application 120 is greater than a threshold, in some cases, computing resources 132 may be allocated from the VR application 120 to one or more non-VR applications 134, at least for a period of time to allow the non-VR applications 134 to process some data, before reallocating such resources back to the VR application 120, for example.

In some cases, if the video rendering performance is insufficient or does not achieve a minimal (or threshold) video rendering rate, significant latency or lag may be experienced by a user who is viewing or experiencing VR content. For example, where a VR application 120 or VR rendering module 122 is underperforming (e.g., not meeting a threshold for performance), a user may experience a significant lag or latency in changes or updates to displayed VR content in response to user motion or actions. In some cases, significant latency in the VR application, e.g., in the rendering of VR content, can cause motion sickness or nausea by the user. Therefore, it may be desirable to decrease the latency experienced by the user, when possible. In some cases the experienced VR latency may be due, at least in part, to a lower (or inadequately) performing VR application 120 or VR rendering module 122 (for example), which may result from inadequate computing resources 132 that are available to or allocated to the VR application 120, e.g., based on usage or demand by non-VR applications 134 for computing resources 132. Therefore According to an example implementation, VR content latency or lag or delay, as experienced by the user may be decreased when an amount of rendering data is decreased, such as by selecting an adjusted smaller display portion (e.g., central portion 224 within partial display boundary 212) of a display screen 130 that may be less than the full display screen (e.g., less than the area within full display boundary 210) for displaying one or more images. In this manner an improved rendering performance (e.g., and lower latency of the output of the VR content) may be achieved by reducing the video rendering load/burden of each display frame, e.g., by reducing the number of pixels to be rendered for each display frame by adjusting or selecting an adjusted portion (such as central portion 224 within partial display boundary 212) of the display screen 130 that may be less (fewer pixels) than the area within the full display boundary 210. Furthermore, a reduced latency of the output of VR content and/or improvement in the performance of the VR application 120/VR rendering module 122 may, at least in some cases, be achieved via allocation of computing resources 132 from one or more non-VR applications 134 to VR application 120, at least for a period of time.

Figure 3:
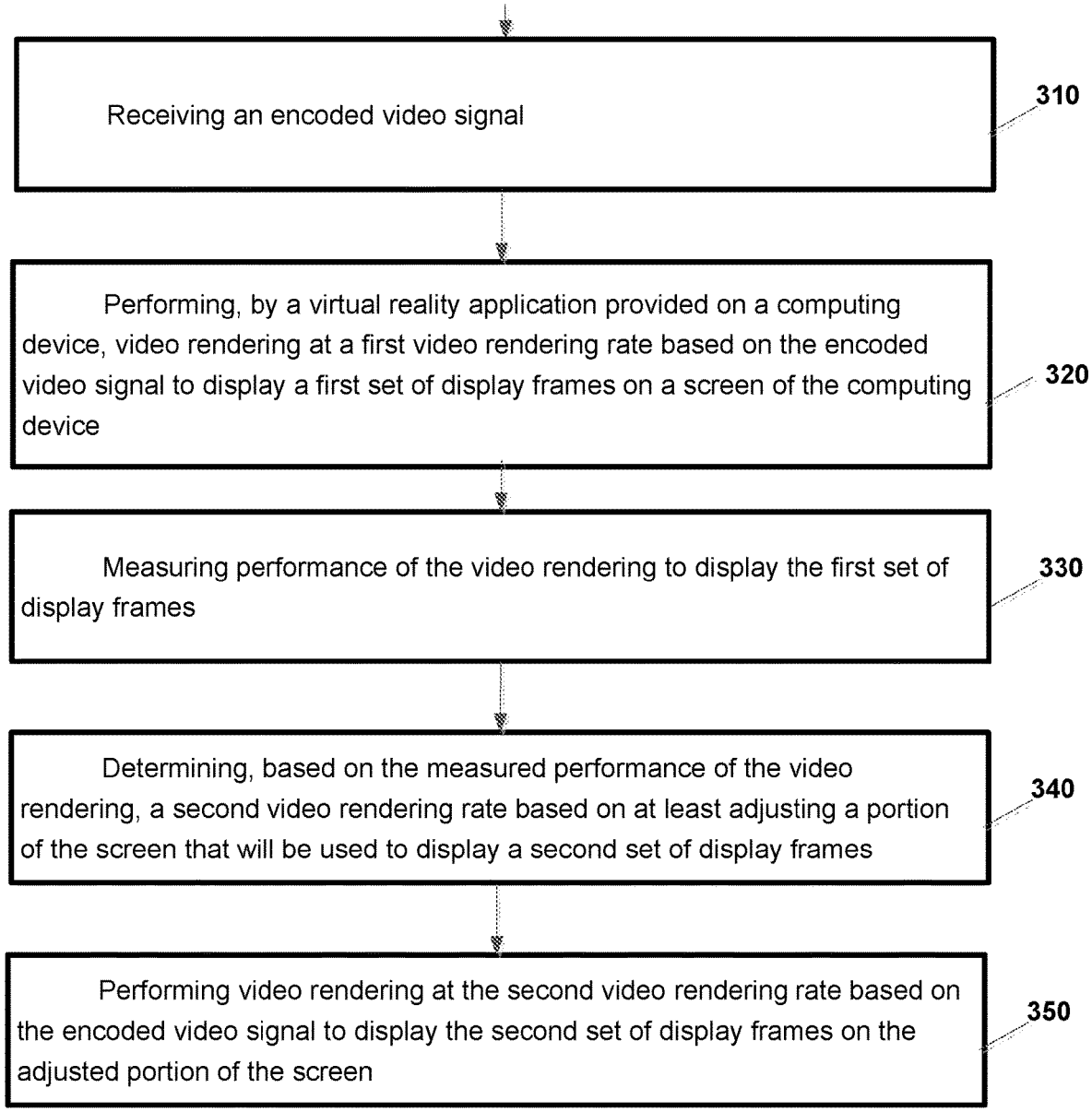
FIG. 3 is a flow chart illustrating operation of a computing device according to an example implementation.

FIG. 3 is a flow chart illustrating operation of a computing device according to an example implementation. Operation 310 may include receiving an encoded video signal. Operation 320 may include performing, by a virtual reality (VR) application provided on a computing device, video rendering at a first video rendering rate based on the encoded video signal to display a first set of display frames on a screen of the computing device. Operation 330 may include measuring performance of the video rendering to display the first set of display frames. Operation 340 may include determining, based on the measured performance of the video rendering, a second video rendering rate based on at least adjusting a portion of the screen that will be used to display a second set of display frames. And, operation 350 may include performing video rendering at the second video rendering rate based on the encoded video signal to display the second set of display frames on the adjusted portion of the screen.

According to an example implementation of the method illustrated in FIG. 3, the determining may include: comparing the performance of the video rendering to a first threshold; and determining a second video rendering rate that is less than the first rendering rate if the performance of the video rendering is less than the first threshold, wherein the adjusting the portion of the screen includes decreasing a portion of the screen that will be used to display the second set of display frames.

According to an example implementation of the method illustrated in FIG. 3, the determining may further include: comparing the performance of the video rendering to a second threshold; and determining a second video rendering rate that is greater than the first rendering rate if the performance of the video rendering is greater than the second threshold, wherein the adjusting the portion of the screen includes increasing a portion of the screen that will be used to display the second set of display frames.

According to an example implementation of the method illustrated in FIG. 3, the measuring may include: determining an amount of time or a number of processor cycles required to display an amount of data or a number of display frames.

According to an example implementation of the method illustrated in FIG. 3, the determining, based on the measured performance of the video rendering, a second video rendering rate based on at least adjusting a portion of the screen that will be used to display a second set of display frames may include determining, based on the measured performance of the video rendering, a second video rendering rate based on at least adjusting a number of pixels in the screen that will be used to display each display frame of the second set of display frames.

According to an example implementation of the method illustrated in FIG. 3, the determining a second video rendering rate further may include adjusting a frame rate for displaying at least the second set of display frames on the screen.

According to an example implementation of the method illustrated in FIG. 3, the determining a second video rendering rate may further include adjusting a display frame or image resolution for displaying at least the second set of display frames on the screen.

According to an example implementation of the method illustrated in FIG. 3, the method may further include comparing the performance of the video rendering to a first threshold; determining that the performance of the video rendering is less than the first threshold; and allocating computing resources of the computing device from one or more non-virtual reality applications running on the computing device to the virtual reality application.

According to an example implementation of the method illustrated in FIG. 3, the method may further include: estimating an eye blinking period of a user of the computing device; and allocating computing resources from the virtual reality application to one or more non-virtual reality application running on the computing device for at least a portion of the eye blinking period. According to an example implementation of the method illustrated in FIG. 3, the estimating may include at least one of the following: predicting at least a start of an eye blinking period of a user of the computing device; and detecting an eye blinking or a start of the eye blinking period of the user of the computing device.

According to an example implementation of the method illustrated in FIG. 3, the method may further include detecting motion or movement of the VR display device; and adjusting (e.g., increasing or decreasing), for at least a period of time after the detecting, a field of view for displaying one or more display frames on the screen.

According to an example implementation of the method illustrated in FIG. 3, the method may further include: detecting motion or movement of the computing device; and adjusting (e.g., increasing or decreasing), for at least a period of time after the detecting, a frame rate for displaying one or more display frames on the screen.

According to another example implementation and apparatus may include at least one processor and at least one memory including computer instructions, when executed by the at least one processor, cause the apparatus to: receive an encoded video signal; perform, by a virtual reality application provided on a computing device, video rendering at a first video rendering rate based on the encoded video signal to display a first set of display frames on a screen of the computing device; measure performance of the video rendering to display the first set of display frames; determine, based on the measured performance of the video rendering, a second video rendering rate based on at least adjusting a portion of the screen that will be used to display a second set of display frames; and perform video rendering at the second video rendering rate based on the encoded video signal to display the second set of display frames on the adjusted portion of the screen.

According to an example implementation, a refresh rate (or frame rate) may refer to a rate that screen 130 refreshes the screen data. There is also an update rate, which is the rate that an image (or rate that a new image) is updated/displayed to the screen 130. Typically, the refresh rate may be the same as the image update rate. However, according to various example implementations, there may be situations where the update rate may be adjusted (e.g., decreased) so as to reduce the video rendering rate (and rendering load) on the computing device 105. In such case, the update rate for the image(s) may be less than the refresh rate of the screen 130.

According to an example implementation, there may be some example situations in which a video rendering rate/load may be reduced. For, example, if the video rendering performance is less than a threshold, then one or more techniques may be used to adjust (e.g., increase or decrease) the video rendering rate/load, e.g., at least in some cases, to free up resources for other tasks, or to select a video rendering rate that is more suitable to the currently available resources for video rendering. Also, in the event that motion of screen 130 is detected, one or more techniques may be used to adjust (e.g., increase or decrease) a video rendering rate.

Several additional example techniques will be briefly described for reducing a video rendering rate. First, as shown in FIG. 2, a display screen 130 may display an image, including a central portion 224 of an image and a peripheral portion 222 of an image. Central portion 224 may be provided at least in or near (or in proximity to) a center of an image, and may be provided within partial display boundary 212, for example. Central portion 224 of an image may typically be more likely to fall around a user's fovea. Peripheral portion 222 of an image may be less likely to fall near a user's fovea. The fovea is a small depression in the retina of the eye where visual acuity is highest. The center of the field of vision is focused in this region, where retinal cones are particularly concentrated. Thus, according to various example implementations, some techniques may be used to reduce a video rendering rate that may exploit the lower visual acuity outside of the fovea, e.g., such as, for example, for a peripheral portion 222 of an image.

According to a first example implementation, a video rendering rate/load may be reduced by updating only a portion of the image. For example, in order to reduce a video rendering rate, only central portion 224 of an image is updated, while peripheral portion 222 is not updated (e.g., for at least a period of time). Thus, with fewer pixels requiring an update, this may reduce the video rendering load/rate.

According to a second example implementation, a video rendering rate may be decreased by updating a first portion of the image at a first update rate, and by updating a second portion of the image at a second update rate that is less than the first update rate. For example, central portion 224 (e.g., at least part of which may lie around a user's fovea) of an image may be updated at a first update rate (e.g., which may be the same as the refresh rate, at least in some examples), while peripheral portion 222 of the image may be updated at a second update rate that is less than the first update rate. Thus, in this example, the peripheral portion 222 of the image may be updated at a lower rate (or not updated at all for a period of time) than the central portion 224 of the image, e.g., which may reduce the overall video rendering rate/load. In this example, using a decreased update rate for the peripheral portion 222 may not be noticeable to a user because, at least in some cases, the peripheral portion 222 (or at least a portion thereof, for example) may lie farther outside a user's fovea, e.g., assuming the user is viewing or looking at a point in the central portion 224, for example.

According to a third example implementation, a video rendering rate may be reduced by using a different resolution for different portions of an image. For example, a reduced video rendering rate may be obtained by updating a first portion (e.g., central portion 224) of an image at a first resolution, and updating a second portion (e.g., peripheral portion 222) of an image at a second resolution that is lower than the first resolution. These various techniques, and other techniques described herein may be combined in various combinations as well. Thus, using a lower resolution to update a portion (e.g., peripheral portion 222) of the image for the video will reduce the video rendering rate.

Figure 4:
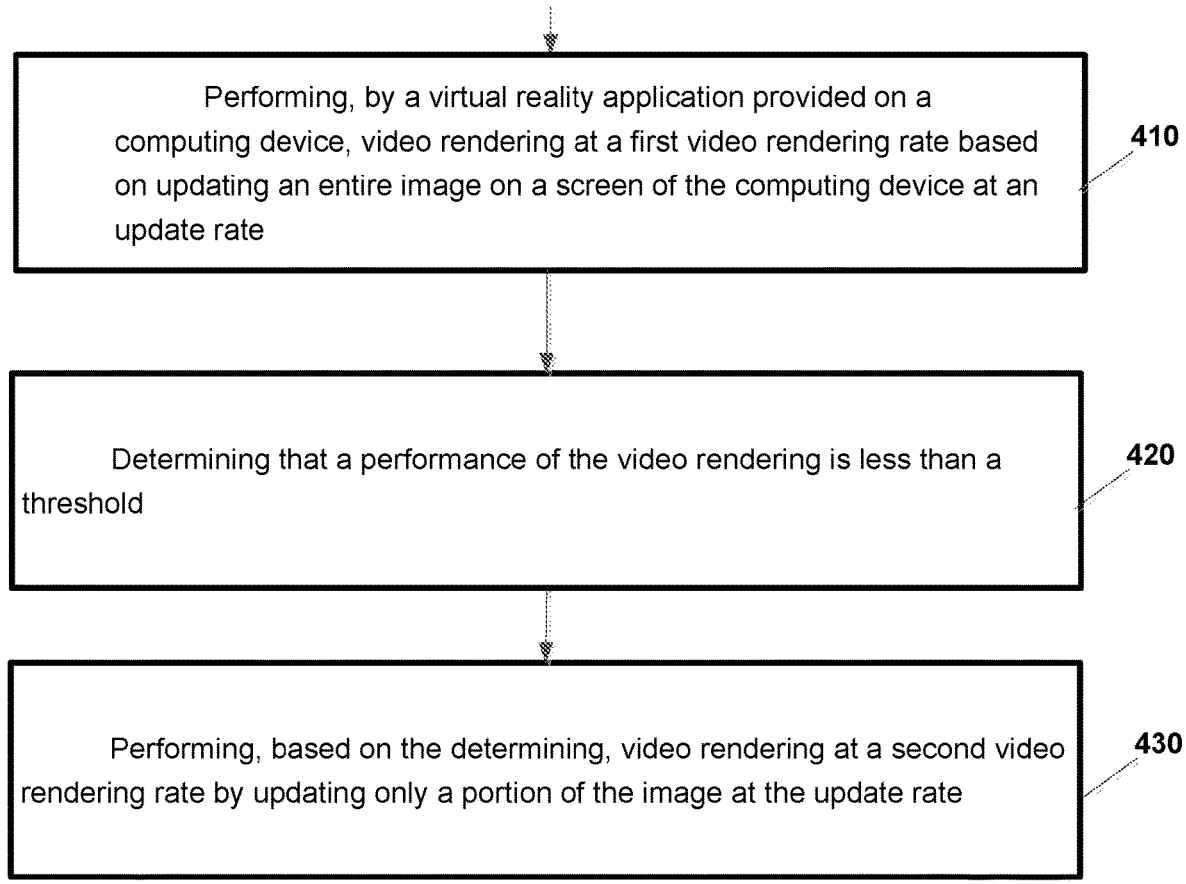
FIG. 4 is a flow chart illustrating operation of a computing device according to an example implementation.

FIG. 4 is a flow chart illustrating operation of a computing device according to an example implementation. Operation 410 includes performing, by a virtual reality application provided on a computing device, video rendering at a first video rendering rate based on updating an entire image on a screen of the computing device at an update rate. Operation 420 includes determining that a performance of the video rendering is less than a threshold. And, operation 430 includes performing, based on the determining, video rendering at a second video rendering rate by updating only a portion of the image at the update rate.

According to an example implementation of the method of FIG. 4, the performing video rendering at a second video rendering rate may include: performing, based on the determining, video rendering at a second video rendering rate by updating only a central portion of the image at the update rate, and not updating a peripheral portion of the image.

Figure 5:
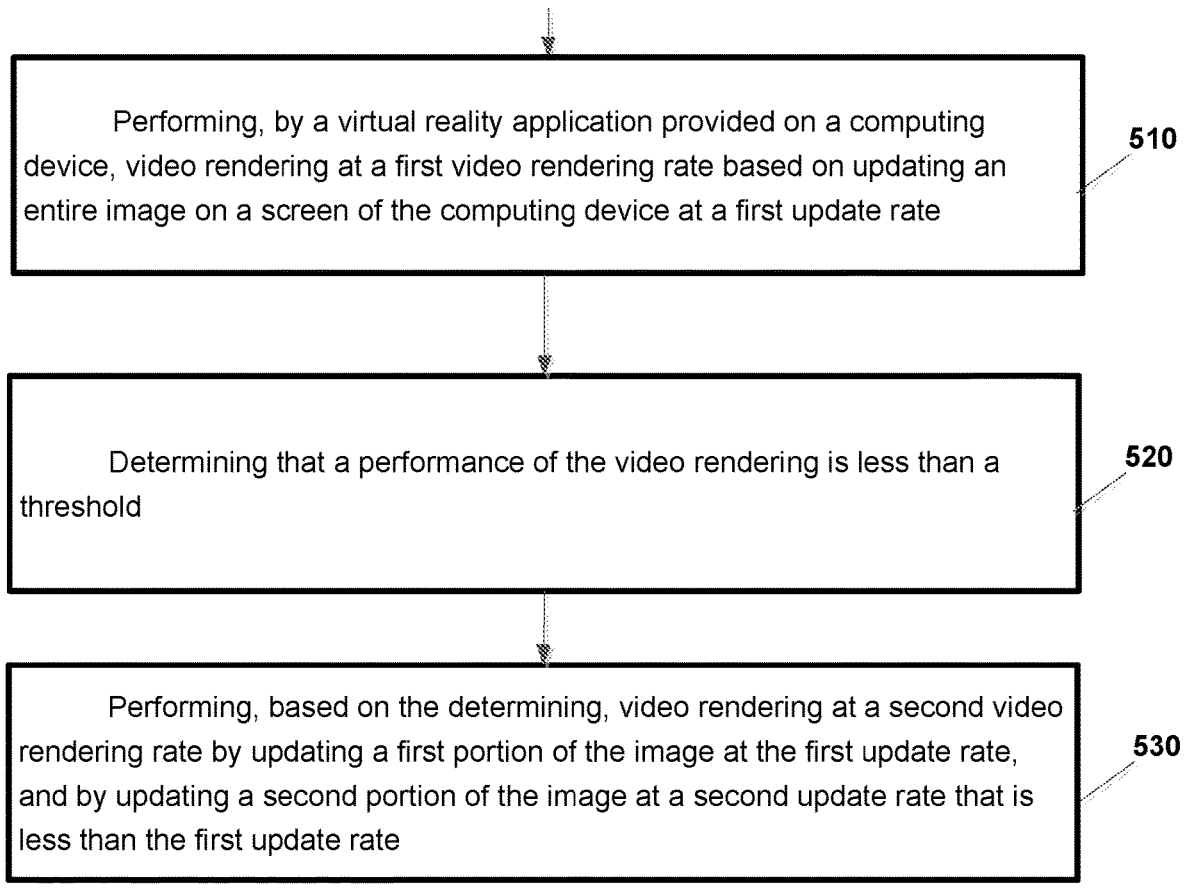
FIG. 5 is a flow chart illustrating operation of a computing device according to another example implementation.

FIG. 5 is a flow chart illustrating operation of a computing device according to another example implementation. Operation 510 includes performing, by a virtual reality application provided on a computing device, video rendering at a first video rendering rate based on updating an entire image on a screen of the computing device at a first update rate. Operation 520 includes determining that a performance of the video rendering is less than a threshold. Operation 530 includes performing, based on the determining, video rendering at a second video rendering rate by updating a first portion of the image at the first update rate, and by updating a second portion of the image at a second update rate that is less than the first update rate.

According to an example implementation of the method of FIG. 5, the performing video rendering at a second video rendering rate may include: performing, based on the determining, video rendering at a second video rendering rate by updating a central portion of the image at the first update rate, and by updating a peripheral portion of the image at a second update rate that is less than the first update rate.

According to an example implementation of the method of FIG. 5, the performing video rendering at a second video rendering rate may include: performing, based on the determining, video rendering at a second video rendering rate by updating a central portion of the image at the first update rate and at a first image resolution, and by updating a peripheral portion of the image at a second update rate and at a second image resolution that is less than the first image resolution, the second update rate being less than the first update rate.

Figure 6:
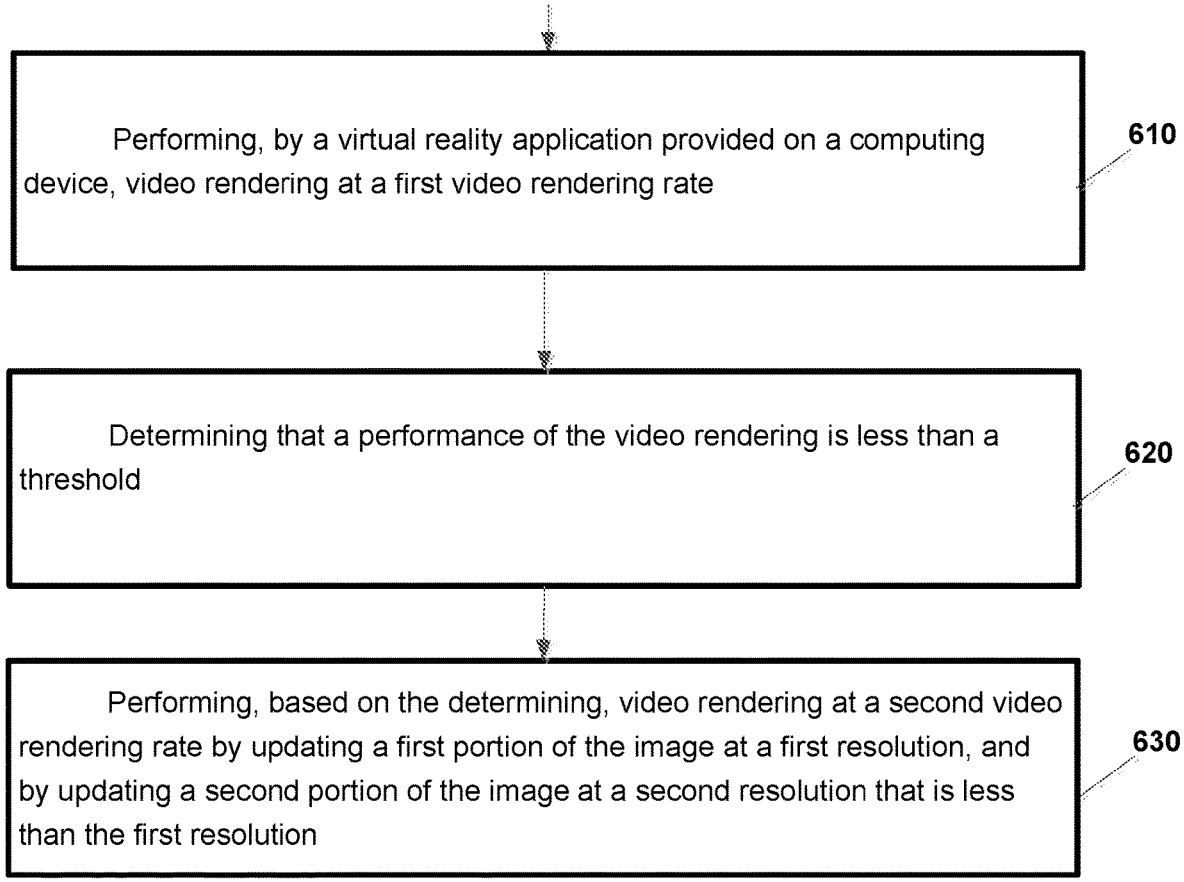
FIG. 6 is a flow chart illustrating operation of a computing device according to another example implementation.

FIG. 6 is a flow chart illustrating operation of a computing device according to another example implementation. Operation 610 includes performing, by a virtual reality application provided on a computing device, video rendering at a first video rendering rate. Operation 620 includes determining that a performance of the video rendering is less than a threshold. Operation 630 includes performing, based on the determining, video rendering at a second video rendering rate by updating a first portion of the image at a first resolution, and by updating a second portion of the image at a second resolution that is less than the first resolution.

According to an example implementation of the method of FIG. 6, the first portion may include a central portion of the image, and the second portion may include a peripheral portion of the image.

Figure 7:
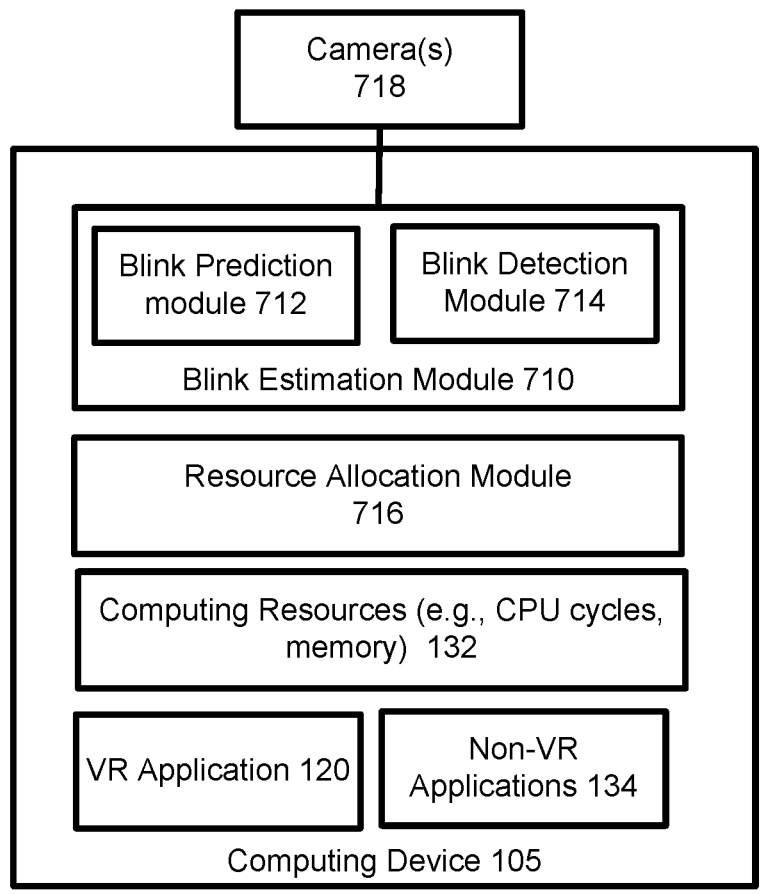
FIG. 7 is a block diagram of computing device according to an example implementation.

FIG. 7 is a block diagram of computing device 105 according to an example implementation. According to an example implementation, computing device 105 (FIGS. 1, 7) may include both a VR application 120 and one or more non-VR applications 134, which may share computing resources 132. In some cases, due to the demanding nature of video rendering and/or other tasks associated with the operation of VR application 120, it may be desirable to allocate all or at least a significant portion of the computer resources 132 to the VR application 120 while VR application 120 is running and/or performing video rendering, in an example implementation. However, by allocating all or a significant portion of the computing resources 132 to the VR application 120, this may fully or at least partially inhibit the operation of one or more non-VR applications 134 during the time period that VR application 120 is running as well, e.g., because sufficient computing resources 132 may not be available to such non-VR applications 134 during this time period.

Furthermore, according to an example implementation, at least some of the computing resources 132 may be allocated from VR application 120 to the one or more non-VR applications 134 to allow the non-VR applications 134 to perform application tasks/process data. However, as noted, allocating resources from the VR application 120 to the non-VR applications 134 may degrade performance of the VR application 120, which may include, for example, decreasing the video rendering performance of the VR rendering module 122, which may unfortunately introduce or cause significant latency or otherwise degrade the VR experience of the user.

Therefore, according to an example implementation, computing device 105 may detect a start of an eye blinking period, during which a user is blinking or has his/her eyes shut, for example. According to an example implementation, during the eye blinking period, resources may be allocated from the VR application 120 to one or more non-VR applications 134 to allow these non-VR applications 134 to operate or process data during at least a portion of the eye blinking period of the user. According to an example implementation, while allocating computing resources 132 from the VR application 120 to the non-VR applications 134 during this blinking period may decrease performance of the VR application 120 and/or increase latency of the VR rendering of the VR content, this increased latency (or decreased rendering performance) is not typically detectable by the user of computing device 105 because the user has his or her eyes closed during the eye blinking period. Therefore, for example, the eye blinking period may be used to allocate resources to non-VR application task(s) and/or to allow non-VR applications 134 to operate or process data.

For example, resource allocation module 716 may allocate computing resources 132 from VR application 120 to one or more non-VR applications 134 during at least a portion of an eye blinking period of a user. Similarly, VR application 120 and/or VR rendering module 122 may reduce a video rendering rate for the VR content, and/or may even stop video rendering or pause video rendering during at least a portion of the eye blinking period of the user, e.g., which may allow computing resources 132 to be allocated to the non-VR applications 134 and/or which may allow non-VR applications 134 to process data during an eye blinking period, for example.

As shown in FIG. 7, the computing device 105 may include one or more cameras 718 or other sensor(s), which may be used to capture or receive images, pictures, video or other signal(s) from (or associated with) the user's eye, e.g., in order to determine or detect a start of a blinking period (e.g., a temporary closing of the user's eye(s)). According to an example implementation, images or pictures of the user's eye(s), or other signal(s), captured or received by cameras 718 or other sensors may be forwarded to a blink estimation module 710. Blink estimation module 710 may include image processing logic or software they may detect or estimate when a user has blinked (e.g., temporarily closed both eyes). Blink estimation module 710 may include a blink detection module 714 for detecting a start of a blinking period (or closing/shutting of a user's eye(s)), e.g., based on image processing logic or software that may detect a change in color at the user's eye based on images or pictures received from cameras 718 or sensors.

Blink estimation module 710 may also include a blink prediction module 712 for predicting when a user may blink an eye and/or may predict or estimate an eye blinking period for the user. For example, based on images or video of a user's eye(s) received from cameras 718 or other sensors, blink prediction module 712 may determine various statistics related to a user's blinking (or temporarily shutting/closing) his or her eyes, such as, for example, an average blinking rate (e.g., a number of blinks per minute, such as for example, 23 blinks per minute) for a user, an average eye blinking period (e.g., a duration or time period for which an eye is closed while blinking, e.g., 200 ms), an average time between eye blinkings (e.g., 7 seconds), and/or other statistics. According to an example implementation, blink prediction module 712 may predict or estimate when a user will likely blink next, or determine a likely next point in time in which a user will blink, e.g., based on various blinking statistics for the user. For example, as a time period or gap between eye blinkings increases and approaches (and/or even surpasses) the average time between eye blinkings for the user, the probability that the user will blink may typically increase, in this illustrative example.

Therefore, according to an example implementation, blink detection module 714 may detect a start of an eye blinking period, e.g., by detecting an eye closing/shutting. Blink prediction module 712 may predict a length of a blinking period. Resource allocation module 716, in response to a notification or indication of a start of a blinking period, may allocate at least some of the computing resources 132 from VR application 120 to one or more non-VR applications 134, e.g., during at least a portion of the eye blinking period. In addition, or in the alternative, VR application 120 and/or VR rendering module 122 may decrease a rate of video rendering and or may even pause or stop video rendering, during at least a portion of the eye blinking period, and one or more of the non-VR applications 134 may run or operate and process data during at least a portion of the eye blinking period.

According to an illustrative example, VR application 120 and VR rendering module 122 may operate and perform video rendering for an initial period of time based on all or a substantial amount/portion of the computing resources 132 while one or more non-VR applications 134 do not operate and/or do not receive significant computing resources 132 during this initial period of time. For example, operation of an email application and/or a texting application (or other non-VR application) may be suspended (temporarily stopped) or slowed during this initial period of time, e.g., in order to allow more of the computing resources 132 to be allocated to the VR application 120, which may increase video rendering performance of the VR application 120 during this initial period of time, and thereby reduce latency of the VR application 120 as experienced by the user during this initial period of time. Therefore, according to an illustrative example(s), during this initial period of time, the email application does not send or receive emails and the texting application does not send or receive a received text messages, for example (or at least fewer emails are sent/received, and fewer text messages are sent/received during this initial period of time) based on no (or fewer) computing resources being allocated to the email application and/or texting application). Thus, for example, during this initial period of time, operation of one or more non-VR applications (such as email, messaging/texting application, etc.) may be suspended (e.g., temporarily stopped/suspended), or reduced, e.g., to allow more resources to be allocated for video rendering and/or to a VR application 120 and/or VR processing (such as video rendering), for example.

When blink detection module 714 detects a start of a blinking period for a user of the computing device 105, resource allocation module 716 may allocate at least some of the computing resources 132 from VR application 120 to one or more non-VR applications, such as the email application and the texting application, web browser, e.g., for at least a portion of the eye blinking period. For example a user may blink (e.g., temporarily close/shut his/her eyes) for a duration, of around 50 ms to 400 ms, and for example, on average may be around 200-300 ms. These numbers are merely illustrative examples, and a blinking duration may be a different period of time. Thus, during a 300 ms (as an illustrative example) eye blink period, one or more non-VR applications may resume processing, e.g., the email application may send and/or receive a number of emails and the texting/messaging application may send and/or receive a number of texts or messages, which may have been waiting to be processed. In addition, the VR application 120 may decrease a video rendering rate and or may even pause or temporarily stop (or suspend) operation or VR rendering during at least a portion of the eye blinking period (e.g., to allocate resources, which were previously used for VR processing/video rendering, to non-VR applications during such blinking period). According to an example implementation, any increased latency or degraded performance (or even non-performance) of the VR application 120 during the eye blinking period may be undetected/undetectable or unviewable by the user because the user has his/her eyes closed during the eye blinking period. At or near the end of the eye blinking period, resource allocation module 716 may, for example, reallocate some of the computing resources 132 from the email application and the texting application (non-VR applications 134) back to the VR application 120, e.g., to allow the VR application 120 to receive an increased amount of the computing resources 132 to allow the VR application 120/VR rendering module 122 to increase its video rendering rate and/or resume performing video rendering at an acceptable video rendering rate, because the user now has his or her eyes open and any latency or degraded performance by VR application 120 may be detectable by the user.

Figure 8:
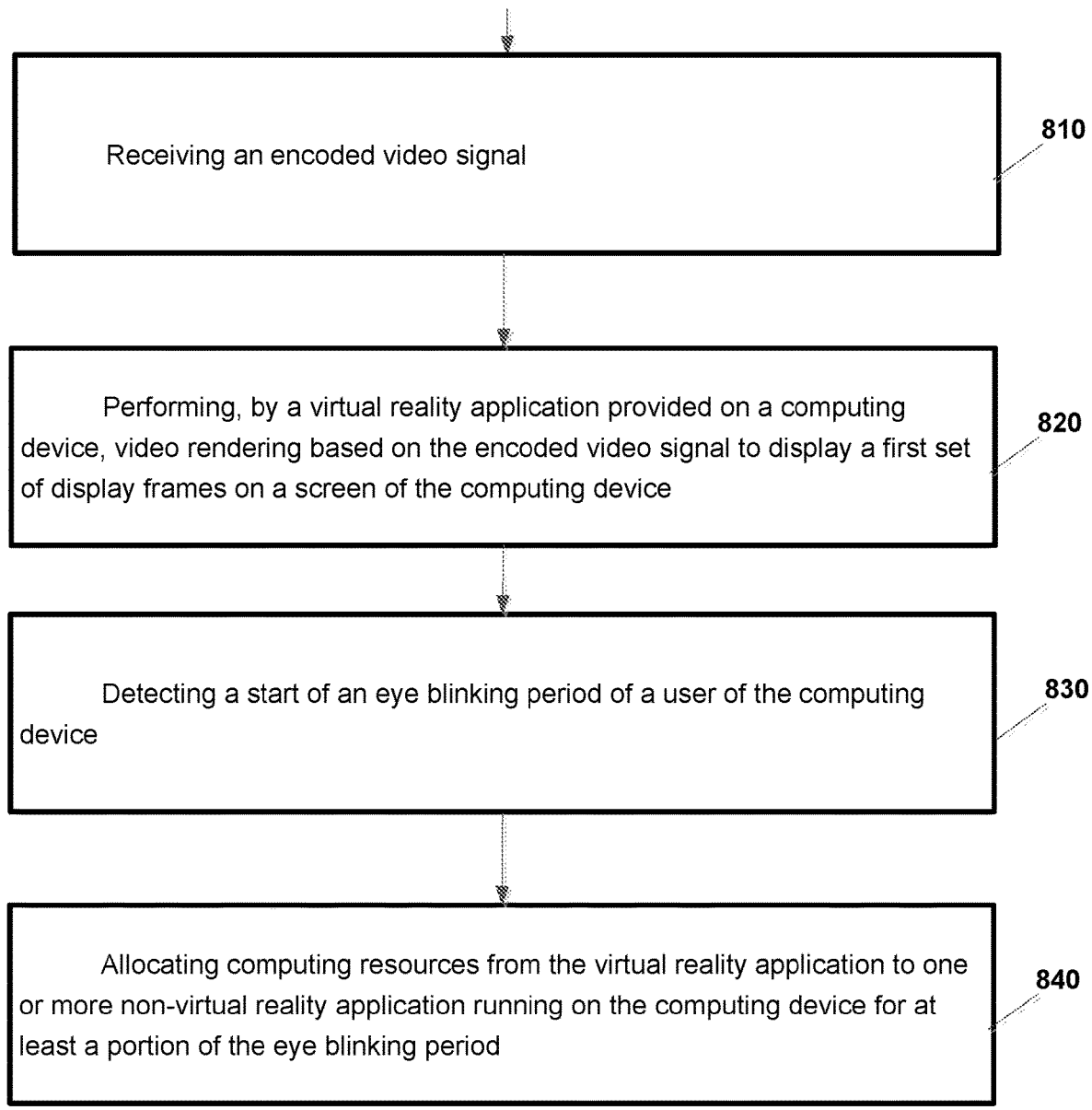
FIG. 8 is a flowchart illustrating an operation of a computing device according to an example implementation.

FIG. 8 is a flowchart illustrating an operation of a computing device according to an example implementation. Operation 810 may include receiving an encoded video signal. Operation 820 may include performing, by a virtual reality application provided on a computing device, video rendering based on the encoded video signal to display a first set of display frames on a screen of the computing device. Operation 830 may include detecting the start of an eye blinking period of a user of the computing device. And, operation 840 may include allocating computing resources from the virtual reality application to one or more non-virtual reality application running on the computing device for at least a portion of the eye blinking period.

According to an example implementation of the method illustrated in FIG. 8, the estimating may include at least one of the following: detecting at least a start of an eye blinking period of a user of the computing device; and estimating the eye blinking period of the user of the computing device.

According to an example implementation of the method illustrated in FIG. 8, the method may further include stopping, by the virtual reality application, video rendering for at least a portion of the eye blinking period; and performing, by one or more non-virtual reality applications running on the computing device, one or more non-video rendering tasks during at least a portion of the eye blinking period.

According to an example implementation of the method illustrated in FIG. 8, the method may further include decreasing, by the virtual reality application, a video rendering rate for at least a portion of the eye blinking period; allocating, for at least a portion of the eye blinking period, at least some computing resources from the virtual reality application to one or more non-virtual reality applications running on the computing device; and performing, by the one or more non-virtual reality applications running on the computing device, one or more non-video rendering tasks during at least a portion of the eye blinking period.

According to an example implementation of the method illustrated in FIG. 8, the method may further include performing the following at or near an end of the eye blinking period: reallocating at least some computing resources back from the one or more non-virtual reality applications running on the computing device to the virtual reality application; and increasing, by the virtual reality application, a video rendering rate.

According to another example implementation, an apparatus may include at least one processor and at least one memory including computer instructions, when executed by the at least one processor, cause the apparatus to: receive an encoded video signal; perform, by a virtual reality application provided on a computing device, video rendering based on the encoded video signal to display a first set of display frames on a screen of the computing device; detect the start of an eye blinking period of a user of the computing device; and allocate computing resources from the virtual reality application to one or more non-virtual reality application running on the computing device for at least a portion of the eye blinking period.

In an example implementation, sensors 128 (FIG. 1) may detect motion, movement or acceleration of the display screen 130 or computing device 105. According to another example implementation, in response to detecting motion, movement or acceleration of the display screen 130, the computing device 105 may adjust (e.g., increase or decrease) a field of view of one or more display images displayed on the screen 130 and/or computing device 105 may adjust (e.g., increase or decrease) a frame rate of displayed images. A field of view (FOV) (also indicated as a field of vision) may include the extent of the observable world/environment that is seen at any given moment. For example, within a VR experience, a field of view may include the extent of the VR world/environment that is seen on the display at any given moment.

According to an example implementation, computing device 105 may include an eye tracking device 142 to track the eye(s) or gaze of the user of the computing device 105 and determine which pixel or object (e.g., a group of associated pixels on the screen 130) that the user is viewing.

When a user is moving, turning, changing his direction of view, then adjusting (e.g., increasing or decreasing) a field of view may, at least in some cases, decrease the amount of blurring or distortion of display images displayed on screen 130. Also, a high frame rate may be unnecessary when a user is moving, because, at least in some cases, images displayed on screen 130 to the user during such motion of the display screen 130 may blur or distort the viewed or displayed frames/images. Thus, it may not be worthwhile for computing device 105 to expend significant computing resources 132 to perform video rendering at a high or threshold video rendering rate, e.g., because many of these display frames displayed on screen 130 during such user/computing device/ screen motion may be blurred or distorted anyway. Thus, during a period of time in which display screen 130 or a user of the computing device is moving, then the frame rate and/or video rendering rate may be adjusted (e.g., increased or decreased) and a field of view may be adjusted (e.g., increased or decreased).

Figure 9:
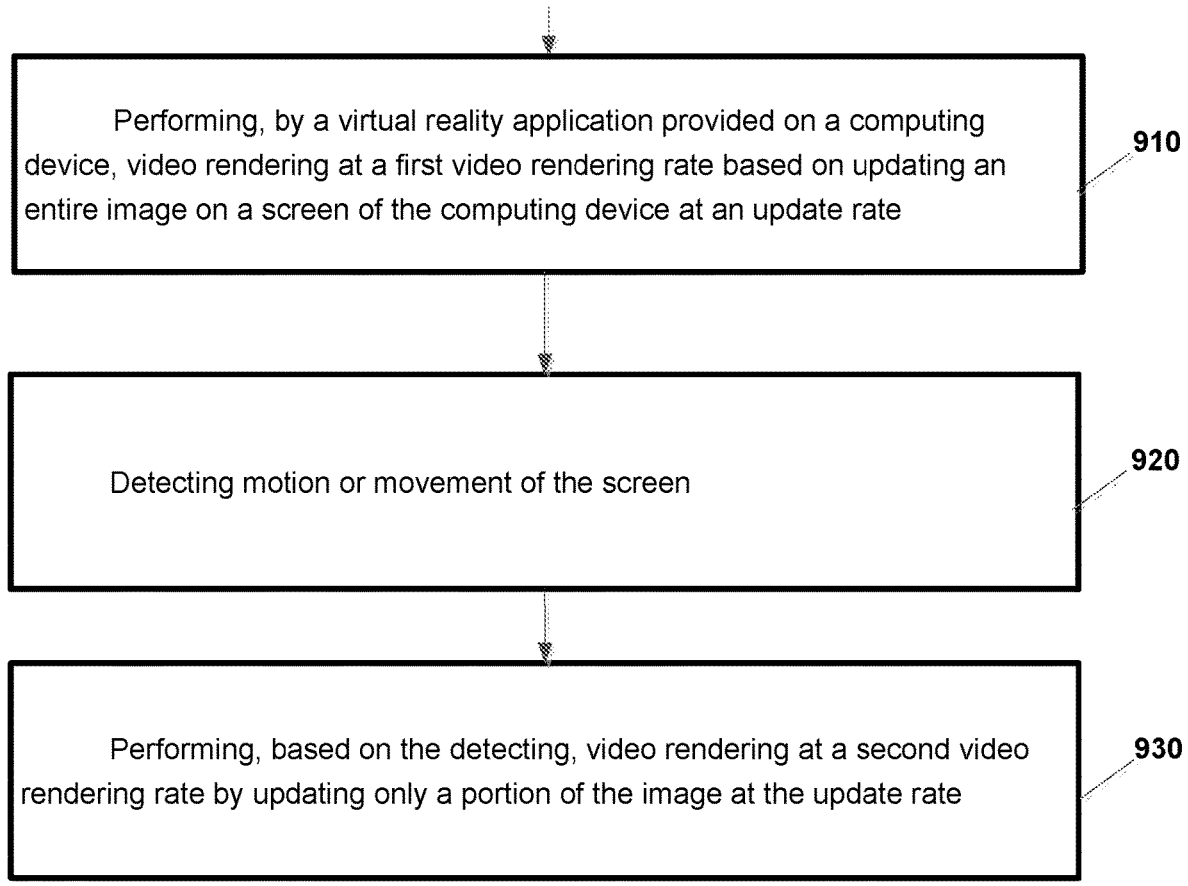
FIG. 9 is a flow chart illustrating operation of a computing device according to an example implementation.

FIG. 9 is a flow chart illustrating operation of a computing device according to an example implementation. Operation 910 includes performing, by a virtual reality application provided on a computing device, video rendering at a first video rendering rate based on updating an entire image on a screen of the computing device at an update rate. Operation 920 includes detecting motion or movement of the screen. And, operation 930 includes performing, based on the detecting, video rendering at a second video rendering rate by updating only a portion of the image at the update rate.

According to an example implementation of the method of FIG. 9, the performing video rendering at a second video rendering rate may include performing, based on the detecting, video rendering at a second video rendering rate by updating only a central portion of the image at the update rate.

Figure 10:
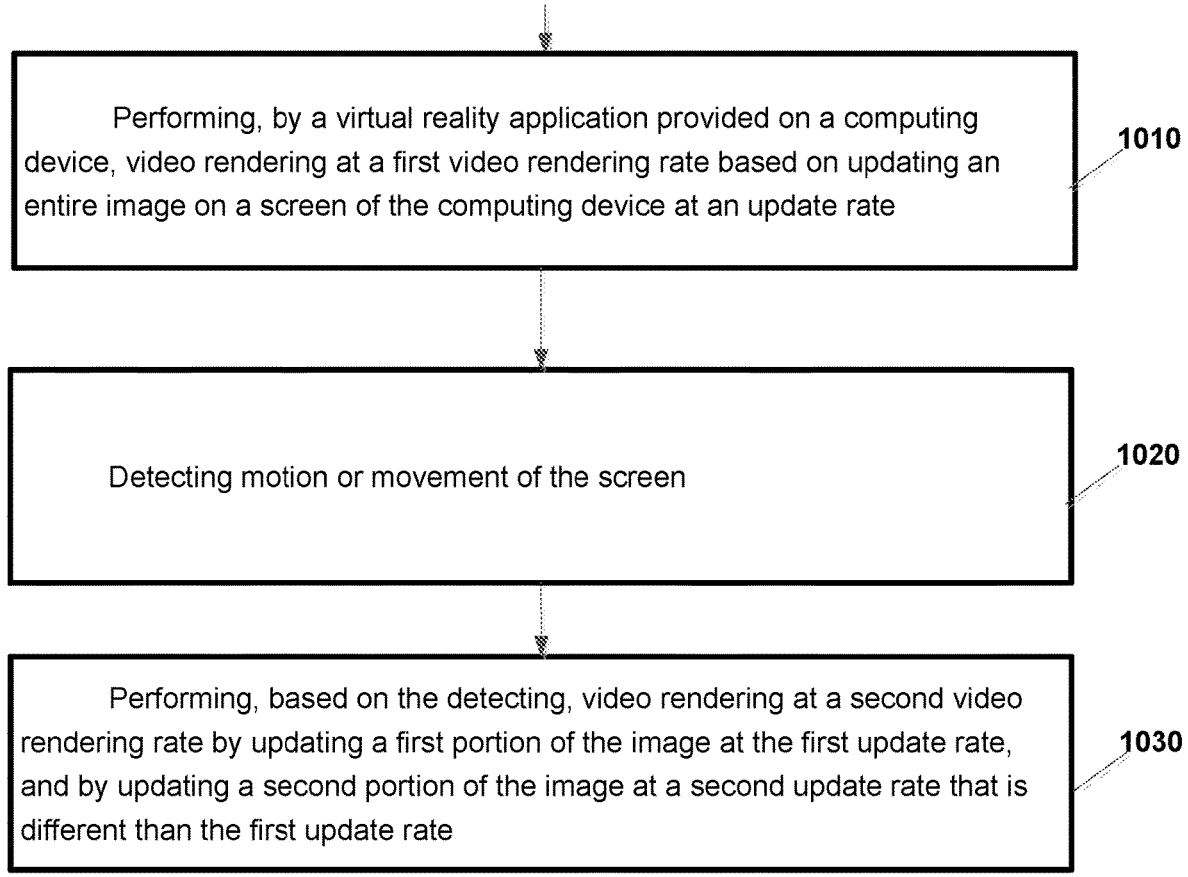
FIG. 10 is a flow chart illustrating operation of a computing device according to another example implementation.

FIG. 10 is a flow chart illustrating operation of a computing device according to another example implementation. Operation 1010 includes performing, by a virtual reality application provided on a computing device, video rendering at a first video rendering rate based on updating an entire image on a screen of the computing device at a first update rate. Operation 1020 includes detecting motion or movement of the screen. And, operation 1030 includes performing, based on the detecting, video rendering at a second video rendering rate by updating a first portion of the image at the first update rate, and by updating a second portion of the image at a second update rate that is different (e.g., greater or less) than the first update rate.

According to an example implementation of the method of FIG. 10, the performing video rendering at a second video rendering rate may include performing, based on the determining, video rendering at a second video rendering rate by updating a central portion of the image at the first update rate, and by updating a peripheral portion of the image at a second update rate that is different (e.g., greater or less) than the first update rate.

According to an example implementation of the method of FIG. 10, the performing video rendering at a second video rendering rate may include performing, based on the detecting, video rendering at a second video rendering rate by updating a central portion of the image at the first update rate and at a first image resolution, and by updating a peripheral portion of the image at a second update rate and at a second image resolution that is less than the first image resolution, the second update rate being less than the first update rate.

Figure 11:
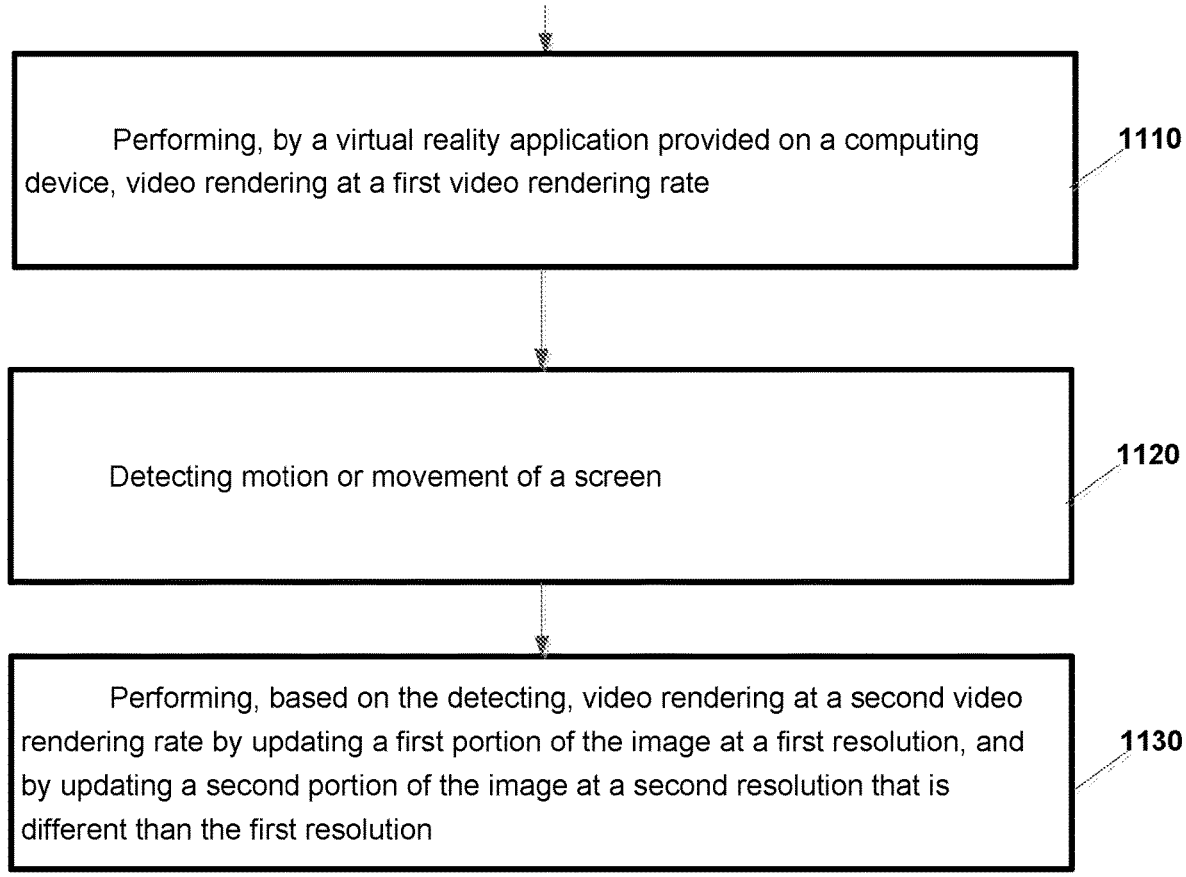
FIG. 11 is a flow chart illustrating operation of a computing device according to another example implementation.

FIG. 11 is a flow chart illustrating operation of a computing device according to another example implementation. Operation 1110 includes performing, by a virtual reality application provided on a computing device, video rendering at a first video rendering rate. Operation 1120 includes detecting motion or movement of a screen. Operation 1130 includes performing, based on the detecting, video rendering at a second video rendering rate by updating a first portion of the image at a first resolution, and by updating a second portion of the image at a second resolution that is different (e.g., greater or less) than the first resolution.

According to an example implementation of the method of FIG. 11, the first portion may include a central portion of the image, and the second portion may include a peripheral portion of the image.

Figure 12:
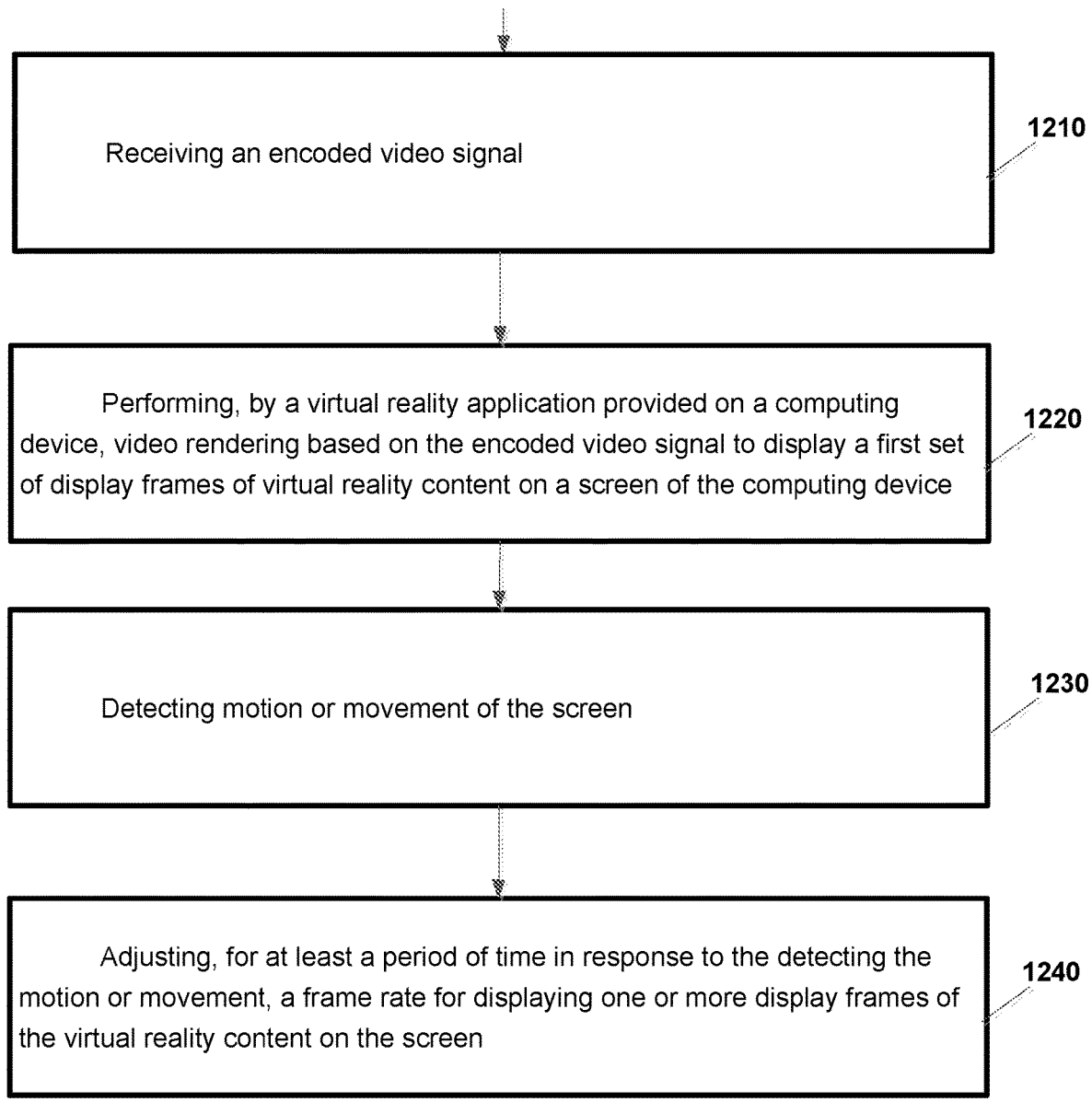
FIG. 12 is a flow chart illustrating operation of a computing device according to another example implementation.

FIG. 12 is a flow chart illustrating operation of a computing device according to another example implementation. Operation 1210 may include receiving an encoded video signal. Operation 1220 may include performing, by a virtual reality application provided on a computing device, video rendering based on the encoded video signal to display a first set of display frames of virtual reality content on a screen of the computing device. Operation 1230 may include detecting motion or movement of the screen. Operation 1240 may include adjusting (e.g., increasing or decreasing), for at least a period of time in response to the detecting the motion or movement, a frame rate for displaying one or more display frames of the virtual reality content on the screen.

According to an example implementation of the method illustrated in FIG. 12, operation 1240 may include decreasing, for at least a period of time in response to the detecting the motion or movement, a frame rate for displaying one or more display frames of the virtual reality content on the screen.

According to an example implementation of the method illustrated in FIG. 12, operation 1240 may include increasing, for at least a period of time in response to the detecting the motion or movement, a frame rate for displaying one or more display frames of the virtual reality content on the screen.

According to an example implementation of the method illustrated in FIG. 12, the method may further include detecting that the motion or movement of the computing device has stopped; and increasing, in response to the detecting that the motion or movement of the display screen of the computing device has stopped, a frame rate for displaying one or more display frames of the virtual reality content on the screen.

According to an example implementation of the method illustrated in FIG. 12, the method may further include adjusting (e.g., increasing or decreasing), for at least a period of time after the detecting of the motion or movement of the display screen of the computing device, a field of view for displaying one or more display frames of the virtual reality content on the screen.

According to an example implementation of the method illustrated in FIG. 12, the method may further include detecting that the motion or movement of a display screen of the computing device has stopped; and adjusting (e.g., decreasing or increasing) the field of view for displaying one or more display frames of the virtual reality content on the screen.

According to an example implementation, an apparatus may include at least one processor and at least one memory including computer instructions, when executed by the at least one processor, cause the apparatus to: receive an encoded video signal; perform, by a virtual reality application provided on a computing device, video rendering based on the encoded video signal to display a first set of display frames of virtual reality content on a screen of the computing device; detect motion or movement of the display device; and adjust, for at least a period of time in response to the detecting the motion or movement, a frame rate for displaying one or more display frames of the virtual reality content on the screen.

As noted above, in an illustrative example implementation, VR goggles 110 (FIG. 1) may display a stereoscopic image, including a left eye image that may be viewed by a user through a left aperture or left eye opening in VR goggles 110, and a right eye image that may be viewed by the user through a right aperture or right eye opening in VR goggles 110, for example. According to an example implementation, the left eye image and the right eye image may include one or more objects displayed on the screen 130. These objects may be, for example, one pixel, or may be a group of associated pixels displayed on the screen 130. Each object may be any object, such as a person, an animal, a thing, or other object. The viewed image may be displayed based on both the right eye image and the left eye image. Various depth cues may be used to convey depth information to a user, such as occlusion (one object blocking or occluding another object), size, perspective, etc.

In an example implementation, in an illustrative stereoscopic image, depth information for one or more objects may also be provided or communicated to the user via a disparity (or distance/separation) between a left viewed object (part of left eye image) and a right viewed object (part of the right eye image).

Convergence may refer to the angle formed by a person's (user's) eyes when aimed at an observed/viewed object. Accommodation refers to the user's eyes focusing on the viewed/observed object. Accommodation demand is inversely proportional to the distance to the object.

In the real world, there is rarely any conflict between accommodation demand and convergence demand. However, for a VR (virtual reality) image or a stereoscopic image displayed on a screen (such as screen 130), there can sometimes be a difference or conflict between accommodation demand and convergence demand. For a display screen, accommodation demand is fixed, since the eyes are focused on the display screen (e.g., distance from eyes to the screen is fixed). (The display in a VR HMD system is a virtual display formed by the lenses. The accommodation demand in this case is the distance to the virtual image of the display formed by the lenses.) However, in some cases, a disparity (or distance) between a left viewed image and a right viewed image may create a variable convergence demand, and in some cases, this convergence demand may be different than the accommodation demand. This conflict between accommodation demand and convergence demand can create tension and an uncomfortable feeling, or eye strain, for the user.

Figure 13:
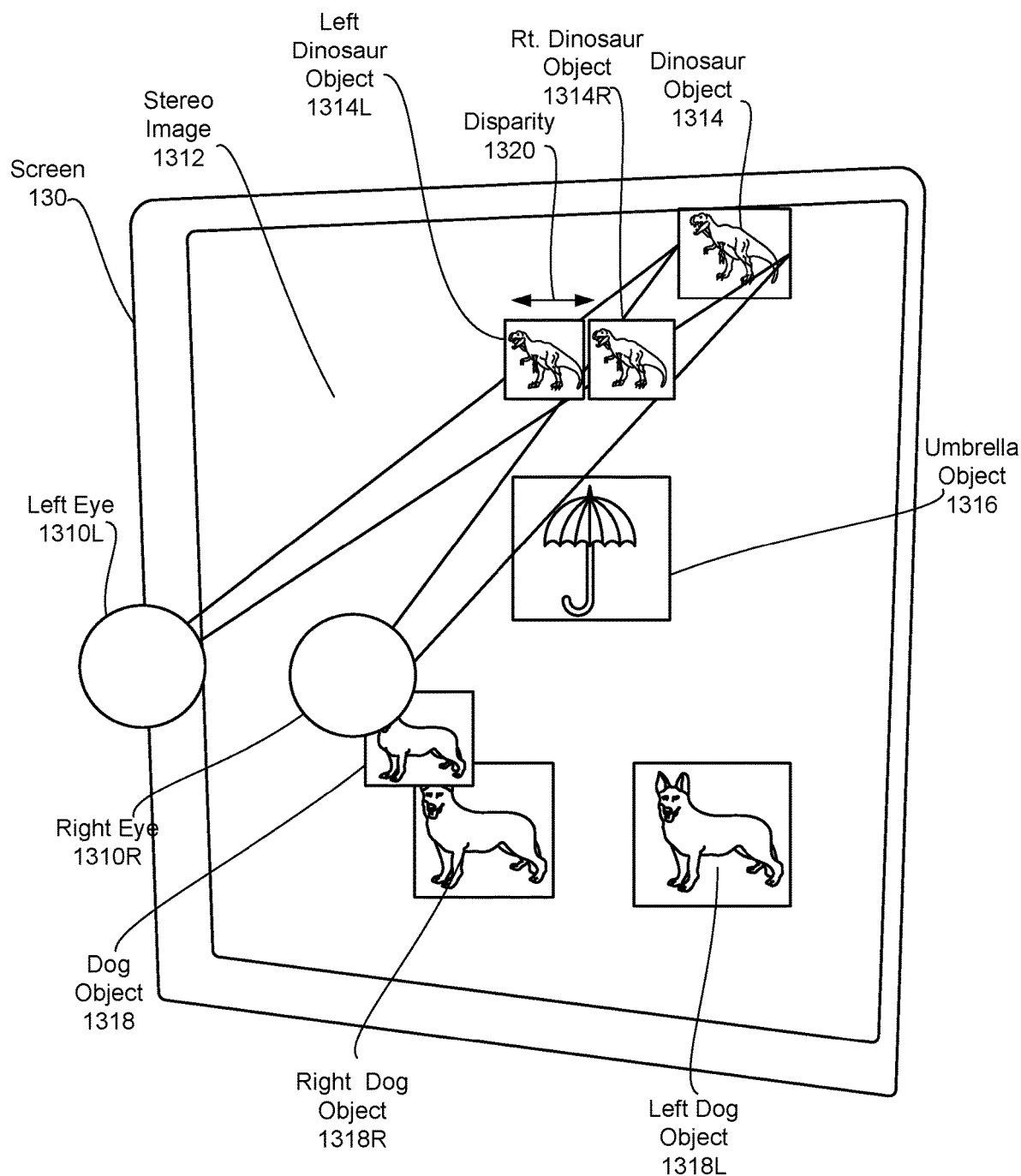
FIG. 13 is a diagram illustrating an example conflict between accommodation demand and convergence demand according to an example implementation.

FIG. 13 is a diagram illustrating an example conflict between accommodation demand and convergence demand according to an example implementation. A stereo (or stereoscopic) image 1312 may be displayed on a screen 130. The image 1312 may include a number of objects, where each object is a portion of the image 1312, and may include one pixel or a group of associated pixels that may display a person, an animal, a thing, or any other object. In the illustrative example stereo image 1312 displayed on screen 130, the objects may include, for example, a dog object 1318, an umbrella object 1316, and a dinosaur object 1314. These are merely some example objects. A user's eyes are shown in FIG. 13, including a left eye 1310L, and a right eye 1310R, aiming and converging to indicate that the user, in this illustrative example, is viewing the dinosaur object 1314.

To present the stereo image 1312, a left eye image is shown to the user's left eye 1310L, and a right eye image is shown to the user's right eye 1310R. The left eye image includes a left dog object 1318L, a left umbrella object (not shown), and a left dinosaur object 1314L. The right eye image includes a right dog object 1318R, a right umbrella object (not shown), and a right dinosaur object 1314R.

According to the illustrative example shown in FIG. 13, the left umbrella object and the right umbrella object (not shown in FIG. 13) are superimposed at the same location, meaning that there is no disparity between the left umbrella object and the right umbrella object. Because there is no disparity between the left umbrella object and the right umbrella object 1316, the umbrella 1316 is located at a distance/depth of the screen 130. The user will typically focus on the screen 130 (accommodation) so that objects of the image will be in-focus. Thus, this means that, in FIG. 13, the convergence demand for the umbrella object 1316 is the same as the accommodation demand, just like in the real world. Thus, there is no conflict or tension when a user views the umbrella object 1316, because the convergence demand is the same as the accommodation demand (the user focuses and converges at the depth of screen 130 in this example, to view the umbrella object 1316, because there is no disparity for umbrella object 1316, as shown in FIG. 13).

According to the example implementation shown in FIG. 13, there is a crossed disparity for the dog object 1318. By crossed disparity, this means that the right eye's dog object 1318R is shown on the left side, and the left eye's dog object 1318L is on the right side. For such crossed disparity (the dog object 1318 in this example), the object will appear to be in front of the screen 130 or closer to the viewer than the screen 130 (less depth than the screen 130).

Also, according to an example implementation shown in FIG. 13, there is an uncrossed disparity 1320 (distance between the left and right dinosaur objects 1314L, 1314R) for the dinosaur object 1314. This disparity 1320 for the dinosaur object is uncrossed because the right eye's dinosaur object 1314R is on the right side and the left eye's dinosaur object 1314L is on the left side. This means that the dinosaur object 1314 will appear to the user to be behind the screen 130 (farther away than the screen 130 or at a greater depth than screen 130). Thus, for example, when a user views either the dinosaur object 1314 or the dog object 1318, there will be a conflict or tension between accommodation demand and convergence demand. This is because, for example, a user viewing the dinosaur object 1314 will typically be focusing on the screen 130 so that the dinosaur object 1314 will be in focus, but the convergence demand is different due to the disparity 1320.

In the example shown in FIG. 13, an eye tracking device 142 (FIG. 1) may be used within the display device 105 to determine that the user is viewing the dinosaur object 1314. As noted, there will be a conflict or tension between the accommodation demand and the convergence demand when a user views the dinosaur object 1314 due to the focus on the screen 130 and the disparity 1320 (or distance between the left and right dinosaur objects 1314L, 1314R) for the dinosaur object 1314. This conflict or tension can be very uncomfortable to the user, and it may be desirable to reduce this conflict, especially if the conflict can be reduced while maintaining the relative depth of the viewed object (e.g., dinosaur object 1314) compared to other objects (e.g., umbrella object 1316, dog object 1318) in the image 1312. By relative depth, this refers to where the dog object 1318 appears to the user as the closest object (having the least depth of these objects), followed by the umbrella object 1316, and then followed by the dinosaur object 1314 as the farthest object from the user (having the greatest depth of these objects).

According to an illustrative example implementation, eye tracking device 142 (FIG. 1) may determine the angle of the user's gaze (angle or direction that the user is viewing/looking at). Also, for example, VR application 120 may project or raycast out into a 3D scene at the angle of the user's gaze to determine the object that intersects the raycast, in order to determine the object that the user is viewing.

Therefore, according to an example implementation, techniques are described to reduce the conflict/tension between accommodation demand and convergence demand for a viewed object. According to an example implementation, this reduction in conflict may be performed while maintaining a relative depth of the viewed object with respect to other objects in the image, and while maintaining a relative depth between other objects, for example.

According to an example implementation, a disparity 1320 between a left viewed object (e.g., left dinosaur object 1314L) and a right viewed object (e.g., right dinosaur object 1314R) may be measured, calculated or determined, e.g., in distance (e.g., inches), or in pixels. A blink detection module 714 may detect a start of an eye blinking period of the user. Computing device 105 may then shift, during the eye blinking period, one or both of the right eye image and the left eye image by the disparity (or disparity distance) to reduce the disparity between the left viewed object (e.g., 1314L) and the right viewed object (e.g., 1314R). For example, just the left eye image may be shifted, or just the right eye image may be shifted, or both of the left and right eye images may be shifted to reduce the conflict/tension. In some cases, one or both the left viewed object and right viewed object may be shifted towards each other, and/or may be shifted so that the disparity is eliminated (this is achieved when the right viewed object and the left viewed object are superimposed at the same location). Once the left eye image and/or right eye image have been shifted, by the disparity (disparity amount), this will reduce (and if fully shifted, should eliminate) the tension/conflict between the left and right viewed images (e.g., 1314L, 1314R). At the same time the disparity of the other objects (e.g., the umbrella object and the dog object) in this case will change correspondingly so that their relative displayed depth, relative to the dinosaur object, will be maintained.

According to an example implementation, the shifting of left and right eye images may advantageously be performed during the blinking period so that this change may be undetected or mostly undetected by the user, for example. Also, in an example implementation, the entire left eye image and the entire right eye image (e.g., including all objects thereon) may be shifted to reduce the disparity 1320 of the viewed object, and also so that relative depth of the objects in the image 1312 will be maintained. Therefore, the two images (left eye image, and/or right eye image) should be shifted as a whole, so as to maintain the relative depth of the other objects with respect to the viewed object. Although, the absolute depth of each object will typically change based on this shifting. This means that all of the left and right objects (being part of the left and right eye images, respectively) on image 1312 will be shifted the same amount that the left and right dinosaur objects 1314L, 1314R are shifted, respectively. Thus, for example, the left and/or right umbrella objects 1316L, 1316R will also be shifted (by the distance disparity 1320, measured with respect to the dinosaur object 1314), and now have a disparity between them. Similarly, the left and/or right dog objects 1318L, 1318R will be shifted by the distance equal to the disparity 1320 (measured with respect to the dinosaur object 1314), and may have a greater disparity between left and right dog objects 1318L, 1318R. This is perceptually acceptable because the short-term goal is to reduce the conflict between accommodation demand and convergence demand for the viewed dinosaur object 1314 only while the user is viewing the dinosaur object 1314.

Figure 14:
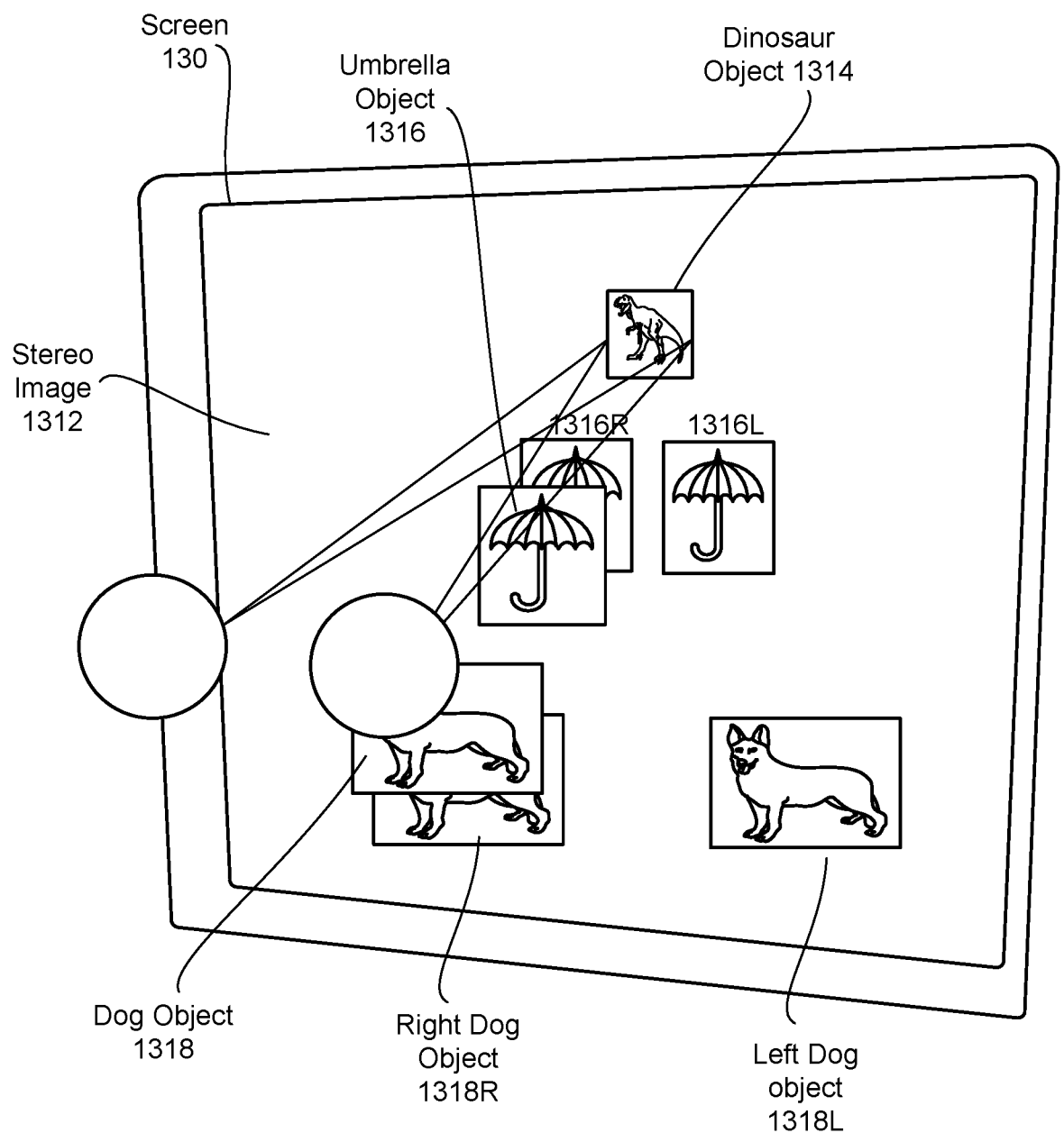
FIG. 14 is a diagram illustrating an example where a conflict between accommodation demand and convergence demand for a viewed object has been reduced or eliminated according to an example implementation.

FIG. 14 is a diagram illustrating an example where a conflict between accommodation demand and convergence demand for a viewed object has been reduced or eliminated according to an example implementation. In this example shown in FIG. 14, the left eye image has been shifted to the right and/or the right eye image has been shifted to the left, e.g., during the blinking period, so as to (at least in some cases) eliminate the disparity 1320 (FIG. 13) between left and right dinosaur objects 1314L, 1314R. Thus, after the shifting, as shown in FIG. 14, the left and right dinosaur objects 1314L, 1314R, are superimposed at the same location, eliminating the disparity 1320, and providing the appearance that the dinosaur is located at a depth of the screen 130. Thus, as shown in FIG. 14, after shifting the left eye image and/or right eye image based on disparity 1320, the convergence demand and accommodation demand for dinosaur object 1314 are the same (no conflict/tension between these demands). Also, in this illustrative example, there is now a crossed disparity between the left and right umbrella objects 1316L, 1316R (e.g., now causing the umbrella object 1316 to appear closer than the screen 130), and the crossed disparity between left and right dog objects 1318L, 1318R is even greater than the disparity shown for these objects in FIG. 13. As noted, increasing the disparity for one or more non-viewed objects is acceptable, and in fact it is desirable, because the goal or objective in this illustrative example is to reduce, and in some cases eliminate, the disparity for the viewed dinosaur object 1314, while maintaining the relative depths between the various objects in the scene.

In an example implementation, VR application may include a 3D game engine. The VR application may, via an application programming interface (API), send a request to the 3D game engine to reduce/eliminate the disparity, and may include the amount of the disparity 1320. In an example implementation, the 3D game engine may know or be able to determine the disparity, and the VR application may send the direction of user gaze to the 3D game engine. The 3D game engine may then use the direction of gaze to identify the object being viewed and its disparity. The 3D game engine may then determine how much to adjust/shift the left and right eye image(s) to reduce or eliminate this disparity for the viewed object. The VR application and/or the 3D game engine may then reduce (or even eliminate) the disparity by shifting one or both of the left and right eye images.

Also, according to an example implementation, the size of the displayed object is not changed based on the shifting of the left and/or right images. Thus, the perceived absolute distance of the viewed object is not affected by the change in absolute disparity, and the fixed relative depth (relative to other objects in the image) also supports the stable perception of the displayed space.

As noted above, the left eye image and/or right eye image may be shifted to reduce or even eliminate the disparity, e.g., during the eye blinking period, so that this shift is not detected by the user. According to another example implementation, the left eye image and/or the right eye image may be shifted a portion of the disparity 1320 each of multiple frames to allow the shifting or image adjustment to be performed gradually over multiple frames when the user has his/her eyes open (during a non-blinking period), so that this shifting or image adjustment (during a non-blinking period) will be less noticeable to the user. For example, if the disparity is 1 inch, then the right eye image may be shifted to the left 0.01 inches each frame for 100 frames, to provide 1 inch of shift, so that the left and right dinosaur objects will be superimposed at the same (or about the same) location to reduce or even possibly eliminate the disparity 1320. Similarly, the left eye image and right eye image may each be shifted 0.005 inches towards each other for each frame of 100 frames until the left and right dinosaur objects 1314L, 1314R are close, or until the disparity 720 has been eliminated or at least reduced.

Also, according to another example implementation, the left eye image and/or right eye image may be shifted a portion (e.g., 30%) of the disparity 1320 during a non-blinking period (e.g., to begin reducing the disparity), or may reduce the disparity over multiple frames when or after the eye tracking device 142 determines that the user is viewing a new object or the viewed object has moved. And, then after a start of an eye blinking period is detected, the shifting of the left and right eye images may be completed so as to further reduce the disparity 720 under the cover of the eye blinking.

According to an example implementation, the VR application or computing device may (slowly) shift at a first (slow) shifting rate, prior to the eye blinking period, one or both of the left eye image and the right eye image to partially reduce the disparity between the left viewed object and the right viewed object before the blinking period. A start of the blinking period is then detected. The VR application or computing device may continue the shifting at a second (faster) shifting rate during the eye blinking period, of one or both of the left eye image and the right eye image to further reduce the disparity between the left viewed object and the right viewed object, wherein the second shifting rate is faster than the first shifting rate. Thus, the VR application may slowly shift, at a first shifting rate, the left eye image and/or right eye image prior to the blinking period, so that such image shifting may be less perceptible to the user, and then may complete the shifting of the image by shifting at a second (faster) shifting rate during the blinking period. Thus, a faster shifting rate may be used during the blinking period because the user is not watching the image/screen during this blinking period. For example, the images may be shifted at a first shifting rate of 0.005 inches per frame before the blinking period (e.g., performing a portion of the shifting), and then may shift at a second shifting rate of 0.05 inches per frame during the blinking period (e.g., to complete the shifting during the blinking period). These are merely some example numbers used for illustration, and other shifting rates may be used.

This process may be repeated each time a user views a new object, or when an object moves location, or when a disparity for a viewed object changes disparity, or periodically, e.g., every 0.5 seconds. A video may show multiple objects that move over time, for example. For example, periodically, e.g., every 0.1 seconds, 0.2 seconds, 0.5 seconds, 0.7 seconds, or other period, the eye tracking device 142 may identify an object that the user is viewing (which may be a new object, or may be the same object, where the disparity may have changed from the previous disparity measurement). Computing device 105 may measure a disparity 1320 for such viewed object. Blink detection module 715 may detect a start of an eye blinking period. The computing device 105 may shift, during the eye blinking period, one or both of the left and right eye images to reduce and/or eliminate the disparity for the viewed object.

According to an example implementation, after detection of a start of an eye blinking period, the computing system may shift only the image of the user's non-dominant eye. The eye dominance of a user can be established by the eye tracking device 142. For example, eye tracking device 142 may record the user's eye movements (of both left and right eyes) during a calibration phase during which targets/objects are shifted rapidly both laterally and in depth. In an illustrative example implementation, the eye tracking device 142 may determine which eye is moving first to the new target location using saccadic movements and that will be the dominant eye. Thus, if the shifting of the image(s) is performed during a non-blinking period (when the user's eyes are open), it may be advantageous to shift only the image of the non-dominant eye, since this image movement in the non dominant eye will be less noticeable as the dominant eye will be fixed on a static image while only the non-dominant eye's image is shifting, for example. Thus, all or part of the image shifting may be performed to reduce/eliminate the disparity, e.g., during a non-blinking period, by shifting only the image for the non-dominant eye, and/or by shifting the image for the non-dominant eye a shift amount that is more than the shift amount of the image of the dominant eye.

Figure 15:
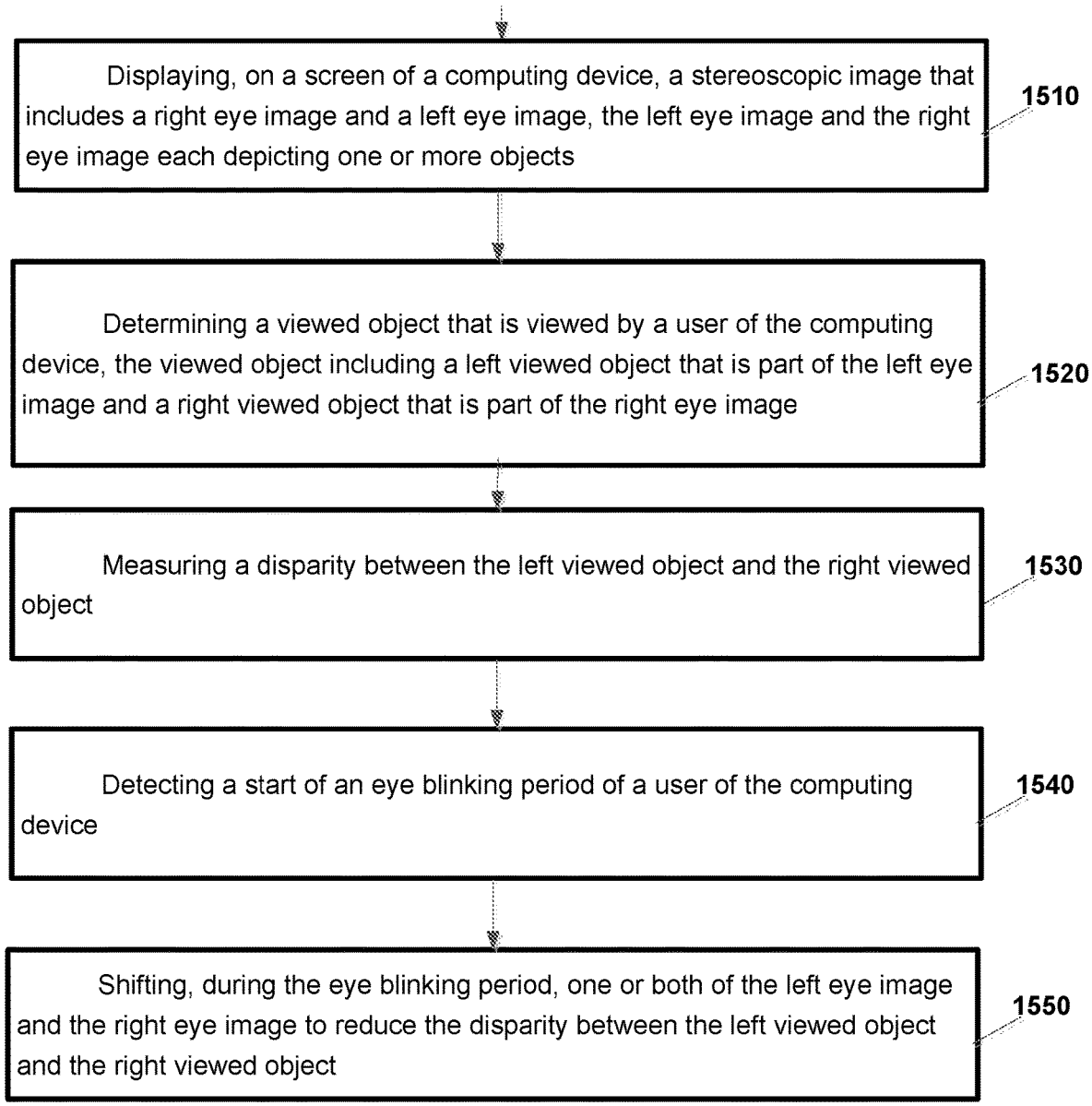
FIG. 15 is a flow chart illustrating operation of a computing device according to an example implementation.

FIG. 15 is a flow chart illustrating operation of a computing device according to an example implementation. Operation 1510 includes displaying, on a screen of a computing device, a stereoscopic image that includes a right eye image and a left eye image, the left eye image and the right eye image each depicting one or more objects. Operation 1520 includes determining a viewed object that is viewed by a user of the computing device, the viewed object including a left viewed object that is part of the left eye image and a right viewed object that is part of the right eye image. Operation 1530 includes calculating or measuring a disparity between the left viewed object and the right viewed object. Operation 1540 includes detecting a start of an eye blinking period of a user of the computing device. And, operation 1550 includes shifting, during the eye blinking period, one or both of the left eye image and the right eye image to reduce the disparity between the left viewed object and the right viewed object.

According to an example implementation of the method of FIG. 15, the shifting may include: shifting, during the eye blinking period, one or both of the left eye image and the right eye image to eliminate the disparity between the left viewed object and the right viewed object.

According to an example implementation of the method of FIG. 15, the shifting may include beginning the shifting, prior to the eye blinking period, of one or both of the left eye image and the right eye image to reduce the disparity between the left viewed object and the right viewed object; and continuing the shifting, during the eye blinking period, of one or both of the left eye image and the right eye image to further reduce the disparity between the left viewed object and the right viewed object.

According to an example implementation of the method of FIG. 15, the method may further include determining which of the user's eyes is a non-dominant eye, and shifting, during a non-eye blinking period, only the eye image of the user's non-dominant eye to reduce the disparity between the left viewed object and the right viewed object.

According to an example implementation of the method of FIG. 15, the viewed object includes a first viewed object, the stereoscopic image includes a first stereoscopic image, the eye blinking period includes a first eye blinking period, the method further including: displaying, on the screen of the computing device, a second stereoscopic image that includes a second right eye image and a second left eye image; determining a second viewed object that is viewed by the user of the computing device, the second viewed object including a second left viewed object that is part of the second left eye image and a second right viewed object that is part of the second right eye image; measuring a disparity between the second left viewed object and the second right viewed object; detecting a start of a second eye blinking period of a user of the computing device; shifting, during the second eye blinking period, one or both of the second left eye image and the second right eye image to reduce the disparity between the second left viewed object and the second right viewed object.

Figure 16:
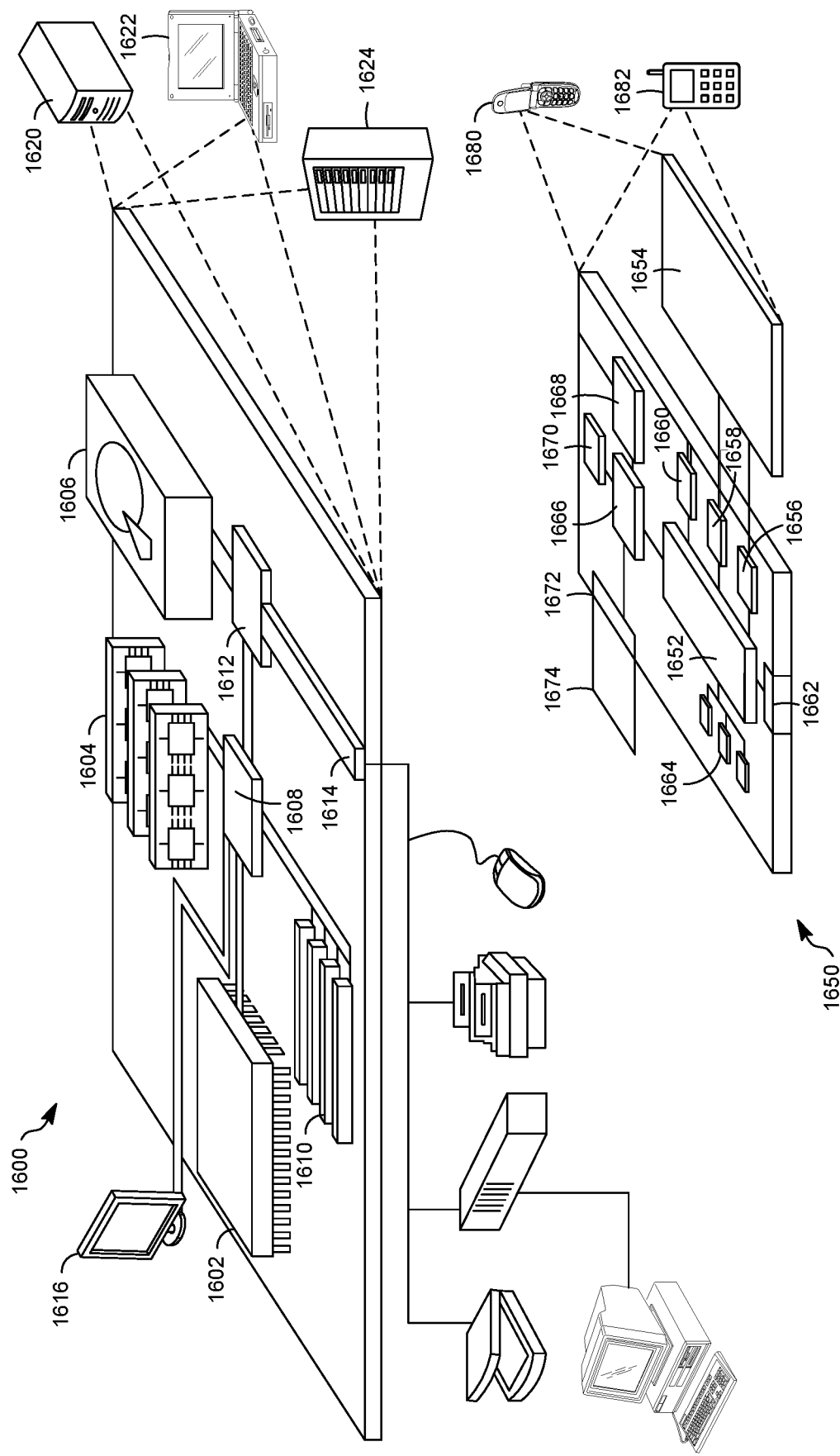
FIG. 16 shows an example of a generic computer device and a generic mobile computer device, which may be used with the techniques described here.

FIG. 16 shows an example of a generic computer device 1600 and a generic mobile computer device 1650, which may be used with the techniques described here. Computing device 1600 is intended to represent various forms of digital computers, such as laptops, desktops, workstations, personal digital assistants, servers, blade servers, mainframes, and other appropriate computers. Computing device 1650 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 1600 includes a processor 1602, memory 1604, a storage device 1606, a high-speed interface 1608 connecting to memory 1604 and high-speed expansion ports 1610, and a low speed interface 1612 connecting to low speed bus 1614 and storage device 1606. Each of the components 1602, 1604, 1606, 1608, 1610, and 1612, are interconnected using various busses, and may be mounted on a common motherboard or in other manners as appropriate. The processor 1602 can process instructions for execution within the computing device 1600, including instructions stored in the memory 1604 or on the storage device 1606 to display graphical information for a GUI on an external input/output device, such as display 1616 coupled to high speed interface 1608. In other implementations, multiple processors and/or multiple buses may be used, as appropriate, along with multiple memories and types of memory. Also, multiple computing devices 1600 may be connected, with each device providing portions of the necessary operations (e.g., as a server bank, a group of blade servers, or a multi-processor system).

The memory 1604 stores information within the computing device 1600. In one implementation, the memory 1604 is a volatile memory unit or units. In another implementation, the memory 1604 is a non-volatile memory unit or units. The memory 1604 may also be another form of computer-readable medium, such as a magnetic or optical disk.

The storage device 1606 is capable of providing mass storage for the computing device 1600. In one implementation, the storage device 1606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1604, the storage device 1606, or memory on processor 1602.

The high speed controller 1608 manages bandwidth-intensive operations for the computing device 1600, while the low speed controller 1612 manages lower bandwidth-intensive operations. Such allocation of functions is exemplary only. In one implementation, the high-speed controller 1608 is coupled to memory 1604, display 1616 (e.g., through a graphics processor or accelerator), and to high-speed expansion ports 1610, which may accept various expansion cards (not shown). In the implementation, low-speed controller 1612 is coupled to storage device 1606 and low-speed expansion port 1614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1600 may be implemented in a number of different forms, as shown in the figure. For example, it may be implemented as a standard server 1620, or multiple times in a group of such servers. It may also be implemented as part of a rack server system 1624. In addition, it may be implemented in a personal computer such as a laptop computer 1622. Alternatively, components from computing device 1600 may be combined with other components in a mobile device (not shown), such as device 1650. Each of such devices may contain one or more of computing device 1600, 1650, and an entire system may be made up of multiple computing devices 1600, 1650 communicating with each other.

Computing device 1650 includes a processor 1652, memory 1664, an input/output device such as a display 1654, a communication interface 1666, and a transceiver 1668, among other components. The device 1650 may also be provided with a storage device, such as a microdrive or other device, to provide additional storage. Each of the components 1650, 1652, 1664, 1654, 1666, and 1668, are interconnected using various buses, and several of the components may be mounted on a common motherboard or in other manners as appropriate.

The processor 1652 can execute instructions within the computing device 1650, including instructions stored in the memory 1664. The processor may be implemented as a chipset of chips that include separate and multiple analog and digital processors. The processor may provide, for example, for coordination of the other components of the device 1650, such as control of user interfaces, applications run by device 1650, and wireless communication by device 1650.

Processor 1652 may communicate with a user through control interface 1658 and display interface 1656 coupled to a display 1654. The display 1654 may be, for example, a TFT LCD (Thin-Film-Transistor Liquid Crystal Display) or an OLED (Organic Light Emitting Diode) display, or other appropriate display technology. The display interface 1656 may comprise appropriate circuitry for driving the display 1654 to present graphical and other information to a user. The control interface 1658 may receive commands from a user and convert them for submission to the processor 1652. In addition, an external interface 1662 may be provided in communication with processor 1652, so as to enable near area communication of device 1650 with other devices. External interface 1662 may provide, for example, for wired communication in some implementations, or for wireless communication in other implementations, and multiple interfaces may also be used.

The memory 1664 stores information within the computing device 1650. The memory 1664 can be implemented as one or more of a computer-readable medium or media, a volatile memory unit or units, or a non-volatile memory unit or units. Expansion memory 1674 may also be provided and connected to device 1650 through expansion interface 1672, which may include, for example, a SIMM (Single In Line Memory Module) card interface. Such expansion memory 1674 may provide extra storage space for device 1650, or may also store applications or other information for device 1650. Specifically, expansion memory 1674 may include instructions to carry out or supplement the processes described above, and may include secure information also. Thus, for example, expansion memory 1674 may be provide as a security module for device 1650, and may be programmed with instructions that permit secure use of device 1650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1664, expansion memory 1674, or memory on processor 1652, that may be received, for example, over transceiver 1668 or external interface 1662.

Device 1650 may communicate wirelessly through communication interface 1666, which may include digital signal processing circuitry where necessary. Communication interface 1666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1668. In addition, short-range communication may occur, such as using a Bluetooth, Wi-Fi, or other such transceiver (not shown). In addition, GPS (Global Positioning System) receiver module 1670 may provide additional navigation- and location-related wireless data to device 1650, which may be used as appropriate by applications running on device 1650.

Device 1650 may also communicate audibly using audio codec 1660, which may receive spoken information from a user and convert it to usable digital information. Audio codec 1660 may likewise generate audible sound for a user, such as through a speaker, e.g., in a handset of device 1650. Such sound may include sound from voice telephone calls, may include recorded sound (e.g., voice messages, music files, etc.) and may also include sound generated by applications operating on device 1650.

The computing device 1650 may be implemented in a number of different forms, as shown in the figure. For example, it may be implemented as a cellular telephone 1680. It may also be implemented as part of a smart phone 1682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method, the method comprising:
   performing video rendering of a portion of a virtual world based on an initial field of view;
   triggering display of the rendered video on a screen;
   responsive to detecting that the screen is physically moving, altering, for at least a period of time after the detecting, the performing of the video rendering;
   allocating at least a portion of computing resources from the performing of the video rendering of the portion of the virtual world to perform non-virtual world processing tasks for at least a portion of the period of time and while continuing to perform video rendering of the portion of the virtual world at a decreased video rendering rate; and
   responsive to detecting the end of the period of time, reallocating, from the non-virtual world processing tasks to the video rendering of the portion of the virtual world, the portion of the allocated computing resources, the reallocating triggering an increase in the video rendering rate associated with the video rendering of the portion of the virtual world.

2. The computer-implemented method of claim 1, wherein:
   the altering the performing of the video rendering includes reducing the portion of the virtual world based on an updated field of view, the updated field of view being smaller than the initial field of view; and
   the allocating of the portion of computing resources is performed such that the video rendering of the portion of the virtual world pauses or temporarily stops.

3. The computer-implemented method of claim 2, wherein the smaller field of view reduces an extent of the virtual world being rendered.

4. The computer-implemented method of claim 1, wherein the performing video rendering of the portion of the virtual world based on an initial field of view includes performing video rendering at a first video rendering rate and the altering the performing of the video rendering includes performing video rendering at a second video rendering rate.

5. The computer-implemented method of claim 4, wherein the performing video rendering at a second video rendering rate includes updating only a central portion of the screen at the second video rendering rate.

6. The computer-implemented method of claim 4, wherein the performing video rendering at a second video rendering rate includes:
   updating a central portion of the screen at a first update rate; and
   updating a peripheral portion of the screen at a second update rate that is less than the first update rate.

7. The computer-implemented method of claim 1, wherein the altering the performing of the video rendering includes adjusting a resolution of the video rendering.

8. The computer-implemented method of claim 1, wherein the altering the performing of the video rendering includes:
   updating a first portion of the screen at a first resolution; and
   updating a second portion of the screen at a second resolution that is different than the first resolution.

9. The computer-implemented method of claim 1, wherein the detecting that the screen is physically moving includes detecting, by a sensor that detects motion, movement, or acceleration of the screen.

10. The method of claim 1, wherein the altering, responsive to detecting that the screen is physically moving further includes adjusting a frame rate associated with rendering the video displayed on the display screen.

11. The method of claim 1, wherein the allocating enables one or more non-VR applications to process data during the portion of the period of time.

12. A computing device comprising:
   a screen;
   a sensor that includes an accelerometer to detect motion or movement of the screen;
   at least one processor; and
   at least one memory including computer instructions that, when executed by the at least one processor, cause the computing device to:
      perform, by a virtual reality application provided on a computing device, video rendering to display a first set of display frames of virtual reality content on a screen of the computing device;
      responsive to detecting, by the sensor, motion or movement of the screen, adjust, for at least a period of time after the detecting of the motion or movement of the screen, a frame rate for displaying a second set of display frames of the virtual reality content on the screen;
      allocate a portion of computing resources from the performing of the video rendering of the virtual reality content to perform non-virtual reality application tasks for at least a portion of the period of time and while continuing to perform video rendering of the virtual reality content; and
      responsive to detecting the end of the period of time, reallocating, from the non-virtual reality application tasks to the video rendering of the virtual reality content, the portion of the allocated computing resources.

13. The computing device of claim 12, wherein the instructions that cause the computing device to:
   adjust the frame rate for displaying the virtual reality content on the screen include instructions that cause the computing device to reduce a size of a portion of a virtual world used in video rendering the second set of display frames of the virtual reality content, and wherein the allocating of the portion of computing resources is performed such that the video rendering of the portion of the virtual world pauses or temporarily stops.

14. The computing device of claim 13, wherein the reduced size of the portion of the virtual world corresponds to a reduced extent of a field of view of the virtual world.

15. The computing device of claim 12, wherein the instructions that cause the computing device to adjust the frame rate for displaying the virtual reality content on the screen include instructions that cause the computing device to increase the frame rate for displaying the virtual reality content on the screen.

16. A computer-implemented method for executing instructions stored on a non-transitory computer-readable storage medium, the method comprising:

performing, by a virtual reality application provided on a computing device, video rendering at a first video rendering rate based on updating an entire image on a screen of the computing device at a first update rate;

responsive to detecting physical movement of the screen, performing, for at least a period of time after the detecting, video rendering at a second video rendering rate by updating a first portion of the image at the first update rate, and by updating a second portion of the image at a second update rate that is different than the first update rate;

allocating a portion of computing resources from the performing of the video rendering to performing non-virtual reality application tasks for at least a portion of the period of time and while continuing to perform video rendering of the virtual reality content; and responsive to detecting the end of the period of time, reallocating, from the non-virtual reality application tasks to the video rendering of the virtual reality content, the portion of the allocated computing resources.

17. The method of claim 16, wherein the performing video rendering at a second video rendering rate comprises:
performing, based on the detecting, video rendering at a second video rendering rate by updating a central portion of the image at the first update rate, and by updating a peripheral portion of the image at the second update rate, the second update rate being less than the first update rate.

18. The method of claim 16, wherein the performing video rendering at a second video rendering rate comprises:
performing, based on the detecting, video rendering at a second video rendering rate by updating a central portion of the image at the first update rate and at a first image resolution, and by updating a peripheral portion of the image at the second update rate and at a second image resolution that is less than the first image resolution, the second update rate being less than the first update rate.

19. The method of claim 16, wherein the performing video rendering at a second video rendering rate comprises:
performing, based on the detecting, video rendering at a second video rendering rate by updating a first portion of the image at a first resolution, and by updating a second portion of the image at a second resolution that is different than the first resolution.

20. The method of claim 16, wherein:
the performing video rendering at the first video rendering rate includes performing video rendering of a portion of a virtual world based on an initial field of view;
the performing video rendering at the second video rendering rate includes performing video rendering of a reduced portion of the virtual world based on a reduced field of view; and
the second video rendering rate being greater than the first video rendering rate.

* * * * *